(12) United States Patent
Paxton et al.

(10) Patent No.: US 10,068,075 B2
(45) Date of Patent: *Sep. 4, 2018

(54) METHOD FOR GENERATING A HUMAN LIKENESS SCORE

(71) Applicant: Distil Networks, Inc., San Francisco, CA (US)

(72) Inventors: Tyler James Paxton, Ann Arbor, MI (US); Reid Michael Tatoris, Ann Arbor, MI (US); Benjamin Trenda, Ann Arbor, MI (US); Elvis Jakupovic, Ann Arbor, MI (US); Steven P. Burkett, Ann Arbor, MI (US); Adam Michael Janower, Ann Arbor, MI (US)

(73) Assignee: Distil Networks, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/734,806

(22) Filed: Jun. 9, 2015

(65) Prior Publication Data

US 2015/0271166 A1 Sep. 24, 2015

Related U.S. Application Data

(63) Continuation-in-part of application No. 14/292,266, filed on May 30, 2014, now Pat. No. 9,501,630, (Continued)

(51) Int. Cl.
*G06F 21/31* (2013.01)
*G06F 17/30* (2006.01)
(Continued)

(52) U.S. Cl.
CPC ........ *G06F 21/316* (2013.01); *G06F 17/3053* (2013.01); *G06F 21/32* (2013.01);
(Continued)

(58) Field of Classification Search
CPC ........ G06F 21/31; G06F 21/316; G06F 21/32; G06F 21/36
(Continued)

(56) References Cited

U.S. PATENT DOCUMENTS 4,912,328 A * 3/1990 Kato ................ H01J 37/28
250/306
6,421,453 B1 * 7/2002 Kanevsky ............ G06F 21/316
340/5.2

(Continued)

OTHER PUBLICATIONS

International Search Report and Written Opinion issued by the International Searching Authority for Application No. PCT/US12/27511, dated Jun. 20, 2012, 9 pages.

(Continued)

*Primary Examiner* — Saleh Najjar
*Assistant Examiner* — Peiliang Pan

(57) ABSTRACT

One embodiment of the invention is a method utilizing a CAPTCHA to generate a human likeness score including blocks: a) receiving a user solution to the CAPTCHA; b) receiving a user interaction pattern descriptive of an interaction undertaken by the user, through a graphical interface of the CAPTCHA, to achieve the user solution; c) determining the accuracy of the user solution; d) comparing the user interaction pattern against an interaction model generated from interaction patterns of previous users; e) calculating the human likeness score based upon the determination of block c) and the comparison of block d), wherein the human likeness score lies within a continuum of human likeness scores.

20 Claims, 12 Drawing Sheets

Related U.S. Application Data which is a continuation of application No. 13/411,071, filed on Mar. 2, 2012, now Pat. No. 8,776,173.

(60) Provisional application No. 61/467,124, filed on Mar. 24, 2011.

(51) Int. Cl.
  *G06F 21/32* (2013.01)
  *G06F 21/36* (2013.01)
  *H04L 29/06* (2006.01)

(52) U.S. Cl.
  CPC .............. *G06F 21/36* (2013.01); *G06F 21/31* (2013.01); *G06F 2221/2103* (2013.01); *G06F 2221/2133* (2013.01); *H04L 63/083* (2013.01)

(58) Field of Classification Search
  USPC ...................................................... 726/2, 27
  See application file for complete search history.

(56) References Cited

U.S. PATENT DOCUMENTS

| | | |
|---|---|---|
| 7,383,570 B2 | 6/2008 | Pinkas et al. |
| 7,454,794 B1 | 11/2008 | Hibberd |
| 7,516,220 B1 | 4/2009 | Stiert |
| 7,606,915 B1 | 10/2009 | Calinov et al. |
| 7,624,277 B1 | 11/2009 | Simard et al. |
| 7,680,891 B1 | 3/2010 | Pongsajapan |
| 7,703,130 B2 | 4/2010 | Pinkas et al. |
| 7,721,107 B2 | 5/2010 | Golle et al. |
| 7,725,395 B2 | 5/2010 | Rui et al. |
| 7,891,005 B1 | 2/2011 | Baluja et al. |
| 7,895,653 B2 | 2/2011 | Calo et al. |
| 7,917,508 B1 | 3/2011 | Baluja et al. |
| 7,929,805 B2 | 4/2011 | Wang et al. |
| 7,941,836 B2 | 5/2011 | Pinkas et al. |
| 7,945,952 B1 | 5/2011 | Behforooz |
| 8,019,127 B2 | 9/2011 | Misra |
| 8,056,129 B2 | 11/2011 | Gusler et al. |
| 8,473,336 B1 | 6/2013 | Simmons |
| 8,528,054 B2 | 9/2013 | King |
| 8,776,173 B2 | 7/2014 | Paxton et al. |
| 9,501,630 B2 | 11/2016 | Paxton et al. |
| 2007/0250920 A1 | 10/2007 | Lindsay |
| 2008/0189768 A1 | 8/2008 | Callahan et al. |
| 2009/0012855 A1 | 1/2009 | Jamal et al. |
| 2009/0077628 A1* | 3/2009 | Elson ..................... G06F 21/36 726/2 |
| 2009/0249477 A1* | 10/2009 | Punera .................... G06F 21/31 726/18 |
| 2009/0319270 A1 | 12/2009 | Gross |
| 2009/0328150 A1 | 12/2009 | Gross |
| 2010/0031287 A1 | 2/2010 | Simon et al. |
| 2010/0049526 A1 | 2/2010 | Lewis et al. |
| 2010/0095350 A1 | 4/2010 | Lazar et al. |
| 2010/0229223 A1 | 9/2010 | Shepard et al. |
| 2010/0287229 A1 | 11/2010 | Hauser |
| 2011/0150267 A1 | 6/2011 | Snelling et al. |
| 2011/0209076 A1 | 8/2011 | Saxena et al. |
| 2011/0225634 A1 | 9/2011 | Pai |
| 2012/0054834 A1* | 3/2012 | King ....................... G06F 21/31 726/4 |
| 2012/0246737 A1 | 9/2012 | Paxton et al. |
| 2014/0317726 A1* | 10/2014 | Turgeman ............... G06F 21/32 726/19 |
| 2015/0347731 A1 | 12/2015 | Paxton et al. |
| 2016/0366177 A1* | 12/2016 | Turgeman ............. G06F 21/552 |

OTHER PUBLICATIONS

Final Office Action issued by The United States Patent and Trademark Office for U.S. Appl. No. 13/411,071, dated Feb. 5, 2014, 4 pages.

Non-Final Office Action issued by The United States Patent and Trademark Office for U.S. Appl. No. 13/411,071, dated Sep. 24, 2013, 8 pages.

Final Office Action issued by The United States Patent and Trademark Office for U.S. Appl. No. 14/292,266, dated Jan. 15, 2016, 18 pages.

Non-Final Office Action issued by The United States Patent and Trademark Office for U.S. Appl. No. 14/292,266, dated Sep. 21, 2015, 42 pages.

* cited by examiner

US 10,068,075 B2

METHOD FOR GENERATING A HUMAN LIKENESS SCORE

CROSS-REFERENCE TO RELATED APPLICATIONS

This application is a continuation-in-part application of U.S. patent application Ser. No. 14/292,266, filed on May 30, 2014, now U.S. Pat. No. 9,501,630, which is a continuation of U.S. patent application Ser. No. 13/411,071, filed on Mar. 2, 2012, now U.S. Pat. No. 8,776,173, which claims the benefit of U.S. Provisional Application No. 61/467,124, filed 24 Mar. 2011, all of which are incorporated in their entireties by this reference.

TECHNICAL FIELD

This invention relates generally to the human verification field, and more specifically to a new and useful method for generating a human likeness score in the human verification field.

BACKGROUND

Many websites and applications apply various techniques and methods to discern a human user from automated software prior to granting certain access or privileges to the user. Distinction between a human user and automated software is often desired, such as when a user is signing up for a service, when a user is attempting to log in to a service or account, when a user is participating in an online poll or forum, or when a user generating an online post. Many websites employ CAPTCHAs (Completely Automated Public Turing tests to tell Computers and Humans Apart) to achieve such functionality. A common CAPTCHA includes a depiction of distorted text images and requires transcription of the distorted text image. However, websites, applications, and other services that implement such CAPTCHAs risk inadvertently driving away traffic by legitimate users (i.e. non-spamming humans) while providing only minimal protection against automated software and human spammers. Alternatively, websites, applications, and other services that fail to implement some such security feature risk security breaches.

Therefore, there is a need in the human verification field to create a new and useful method for generating a human likeness score indicative of the legitimacy of a use. This invention provides such a new and useful method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
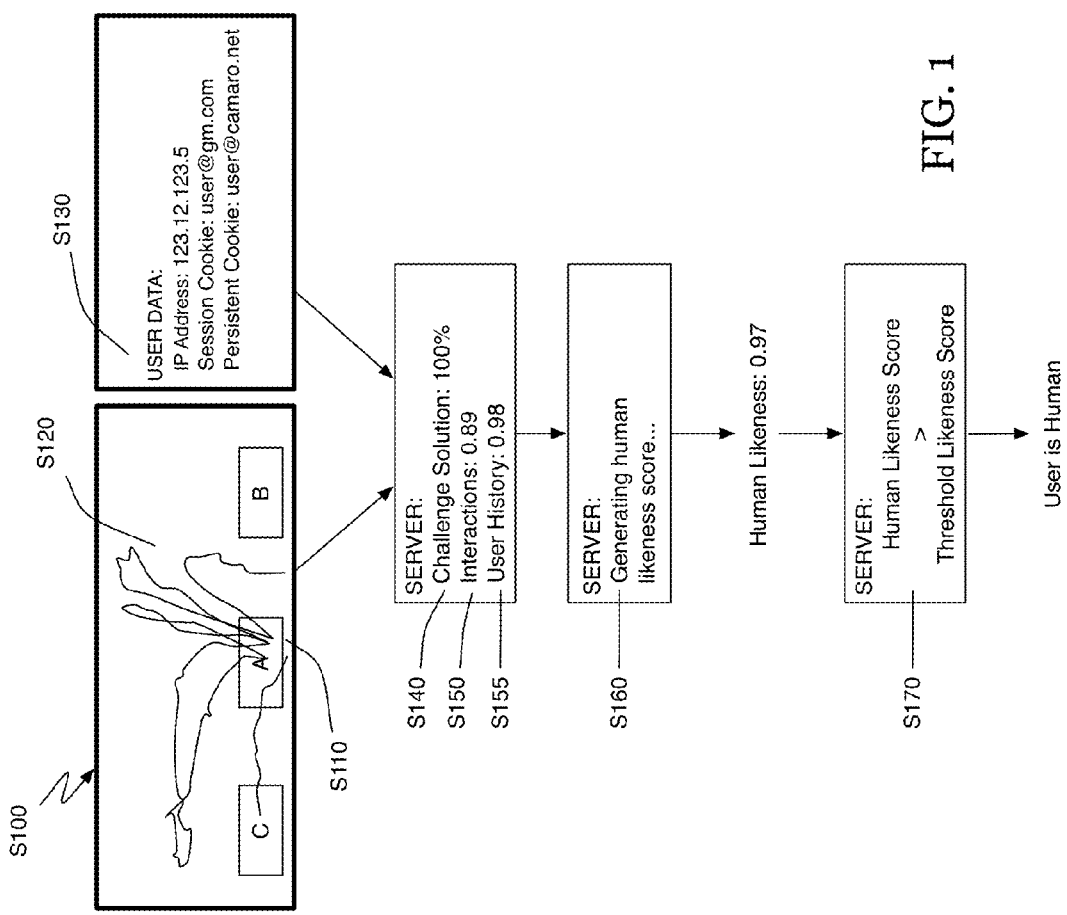
FIG. 1 is a flowchart representation of a method of the preferred embodiment of the invention.

As shown in FIG. 1, the method S100 utilizing a CAPTCHA to generate human likeness score, the CAPTCHA provided through a graphical interface, includes the blocks of: receiving a user solution to the CAPTCHA S110; receiving a user interaction pattern descriptive of an interaction undertaken by the user, through the graphical interface, to achieve the user solution S120; determining the accuracy of the user solution S140; comparing the user interaction pattern against an interaction model generated from interaction patterns of previous users S140; and calculating the human likeness score based upon the determination of block S130 and the comparison of block S150, wherein the human likeness score lies within a continuum of human likeness scores S160. The method S100 may further include the blocks of: comparing the human likeness score to a threshold likeness score to verify that the user is human S170 and/or adding the user solution to a catalog of user preferences S180. The method S100 may also include the blocks of: receiving a request for a CAPTCHA; and fulfilling the request for the CAPTCHA by generating certain details of the CAPTCHA and/or the complete CAPTCHA S190.

As shown in FIG. 1, the method S100 may also be a method utilizing a CAPTCHA to verify that a user is human, the CAPTCHA provided through a graphical interface, including the blocks of: receiving a user solution to the CAPTCHA S110; receiving a user interaction pattern descriptive of an interaction undertaken by the user, through the graphical interface, to achieve the user solution S120; receiving user data that is distinct from the CAPTCHA and the user interaction pattern S130; determining the accuracy of the user solution S140; comparing the user interaction pattern against an interaction model generated from interaction patterns of previous users S150; analyzing the user data for automated software (or human spammer) indicators S155; calculating a human likeness score based upon the determination of Block S140, the comparison of Block 150, and the analysis of Block S155, wherein the human likeness score lies within a continuum of human likeness scores S160; and comparing the human likeness score to a threshold likeness score to verify that the user is human S170.

Figure 4:
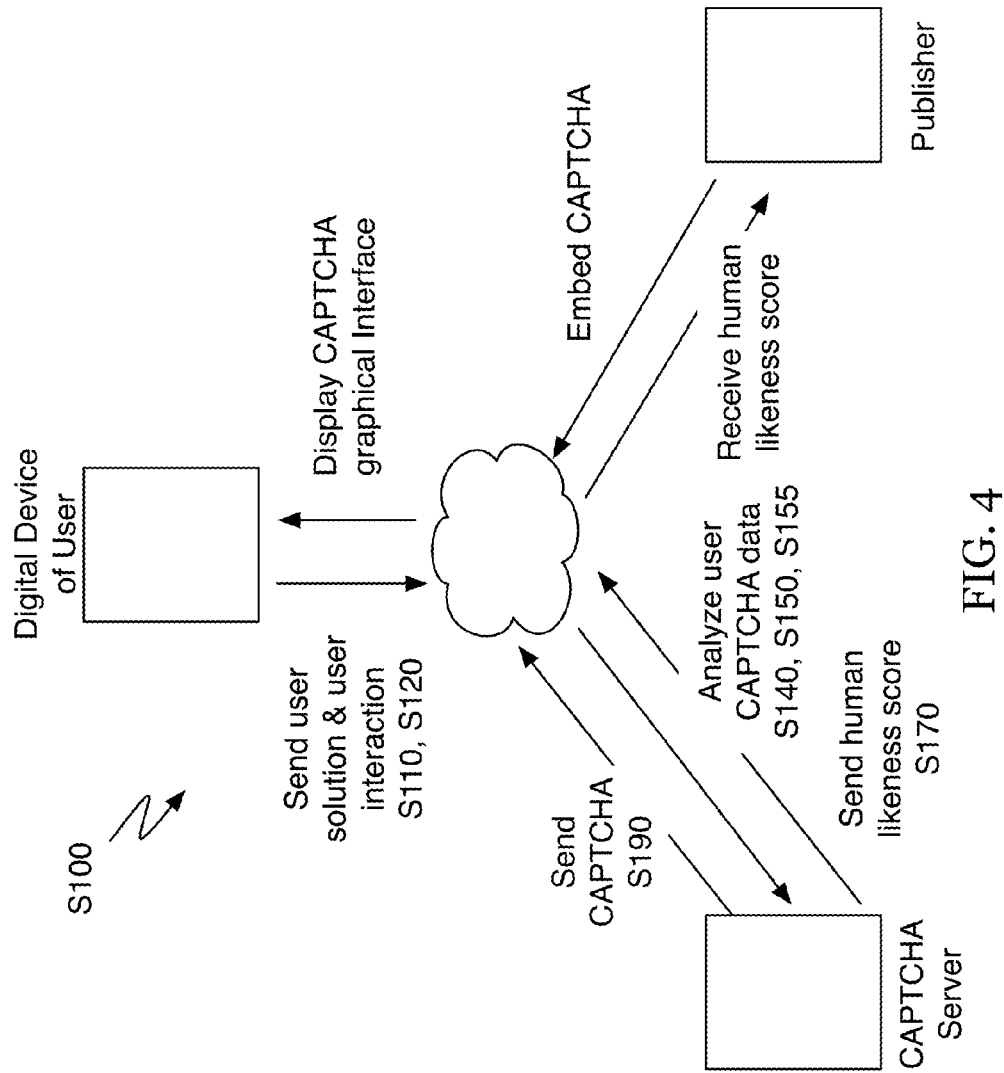
FIG. 4 is a flowchart representation of a system implementation of the preferred embodiment.

The method S100 is preferably performed by a server in communication with a publisher configured to present the CAPTCHA to the user via a host website or application. The publisher may present the CAPTCHA to the user via: a website; a mobile application; a web- or application-based forum; an online, desktop, or application-based email client; an online gaming site or service (e.g., Xbox live); or any other suitable site, service, or application configured to provide data to the user and to receive an input from the user. The site, service, or application through which the CAPTCHA is presented to the user preferably executes on a digital device incorporating a digital display, such as an automotive console, a desktop computer, a laptop computer, a tablet computer, a television, a radio, a desk phone, a mobile phone, a smartphone (e.g., an iPhone), a PDA, a personal navigation device, a personal media player (e.g., MP3 player, iPod), a camera, a gaming console or controller, a remote control, a watch, or a heads-up display (HUD). The publisher and/or server preferably communicate(s) with the digital device via a communication channel, such as Wi-Fi, LAN, 3G cellular, 4G cellular, Ethernet, or other cellular or internet connection, or via any other analog or digital communication channel. The transfer of data, including details of the CAPTCHA, user data, the user solution, the user interaction, and the human likeness score, between relevant parties is depicted in FIG. 4.

In one variation, the server generates the CAPTCHA, including the content in and instructions of the CAPTCHA, and sends the CAPTCHA to the publisher, wherein the publisher then presents the CAPTCHA to the user. In a second variation, the server generates the CAPTCHA, including the content in and instructions of the CAPTCHA, and directly presents the CAPTCHA to the user (e.g., through a host website or application) following a request therefor from the publisher. In a third variation, following a request for a CAPTCHA from the publisher, the server specifies specific details of the CAPTCHA (i.e. less than the entirety of the CAPTCHA) and sends the details to the publisher, wherein the publisher then assembles the CAPTCHA, based upon the details, and presents the CAPTCHA to the user. In a fourth variation, the CAPTCHA is generated, at least in part, by the publisher (e.g., by selecting a CAPTCHA format from the set of generic CAPTCHA formats shown in FIGS. 3A-3H and assigning details to the CAPTCHA); in this variation, the server may solely function to analyze the user solution and the user interaction to generate the human likeness score (i.e. Blocks S110-S160). However, the server and/or the publisher may function together or separately to create the CAPTCHA and present the CAPTCHA to the user.

The method S100 of the preferred embodiment utilizes a CAPTCHA, a "Completely Automated Public Turing test to tell Computers and Humans Apart," to generate the human likeness score S160 and/or to verify that the user is human S170. The CAPTCHA is preferably presented to the user prior to granting additional access or information to the user, prior to completing a transaction, prior to generating a user account, and/or for any other reason necessitating verification that the user is human (or not automated software or a human spammer).

Figure 2:
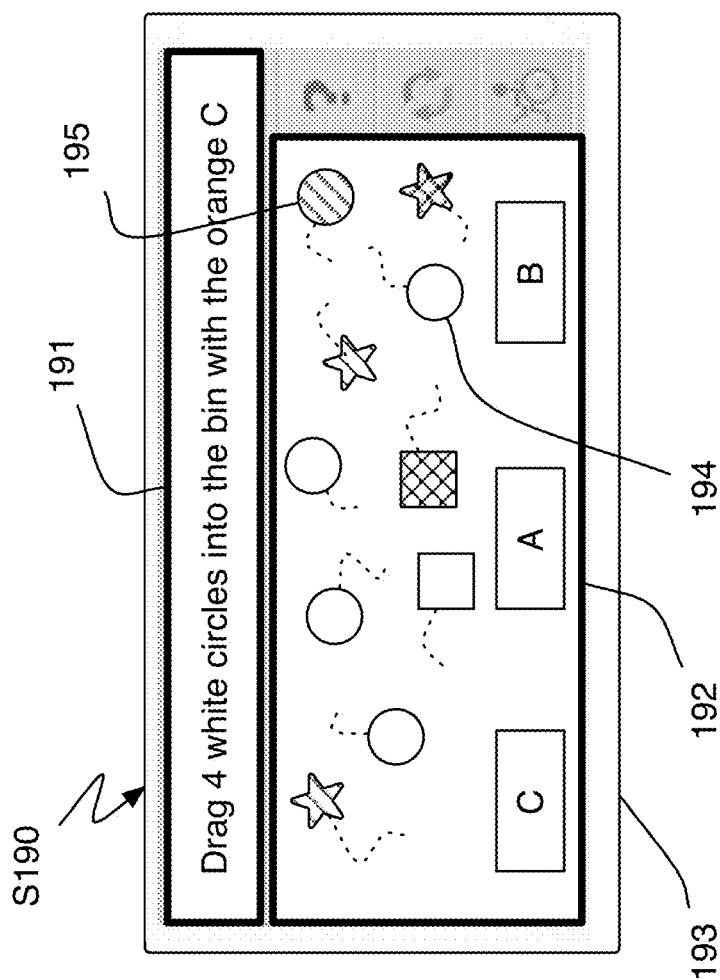
FIG. 2 is a schematic representation of the elements of a CAPTCHA of the preferred embodiment.

As shown in FIG. 2, the CAPTCHA preferably includes a graphical interface 193; the graphical interface 193 may be, effectively, a "box" presented to the user on the digital display of a digital device of the user, wherein information, symbols, and/or other objects relevant to the CAPTCHA are presented therein and the user employs the information, symbols, and/or other objects to complete the CAPTCHA. However, the graphical interface 193 may be of any other form defining any other input area. The graphical interface 193 may be depicted within a web browser or application directly, or may be presented within a pop-up window or separate application, though the graphical interface 193 may be presented to the user in any other way.

As shown in FIG. 2, an object 194 is preferably depicted within the graphical interface 193 of the CAPTCHA. At least one characteristic or trait of the object is preferably haphazard, randomly generated, pseudorandomly generated, or otherwise seemingly irregular in selection or assignment. (Because the server fulfilling the method S100 may incorporate software incapable of generating a truly random number or truly random instance, the characteristic of the object 194 may be pseudorandomly generated, such as by accessing a clock instance, by stepping through the digits of pi, or by any other method of pseudorandomly generating a number or other instance; the publisher may also fulfill the role of specifying details of the CAPTCHA, including the characteristic of the object 194.) The characteristic of the object 194 may be any of: the initial location, the initial orientation, the initial speed, the initial direction of motion, the (initial) color, the (initial) size, the (initial) orientation, the (initial) shape, and the (initial) context of the object 194. Preferably, the irregular assignment of the characteristic of the object 194 differentiates the CAPTCHA from a previous CAPTCHA presented to the user or any other user. This preferably yields the benefit of generating a substantially unique CAPTCHA that automated software (e.g., a bot, an automated script, automated software), posing as a human, cannot solve by simply capturing an instance of the CAPTCHA and accessing the CAPTCHA solution by finding the captured instance in a database of CAPTCHA instances and associated CAPTCHA solutions. Specifically, CAPTCHAs thus generated may be substantially unique, wherein (almost) every such CAPTCHA requires a unique solution to complete; this may force an automated script, posing as a human, to understand the CAPTCHA and fully comprehend the CAPTCHA, which is far more difficult to achieve than practices currently implemented in the field of automated CAPTCHA solvers; such CAPTCHAS, therefore, may be more secure and accurate in isolating humans from automated software.

Figure 6A:
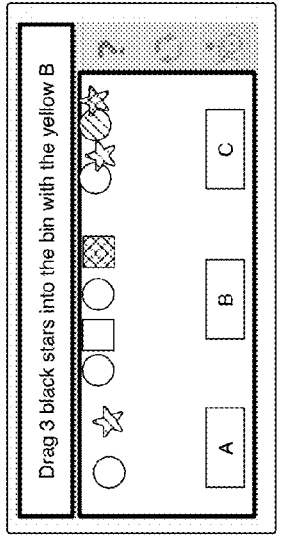
FIGS. 6A, 6B, and 6C are schematic representations of a CAPTCHA of the preferred embodiment at various time intervals.
Figure 6B:
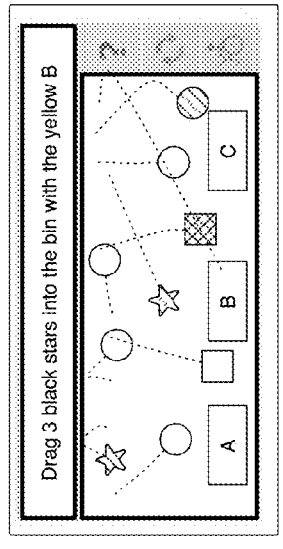
Figure 6C:
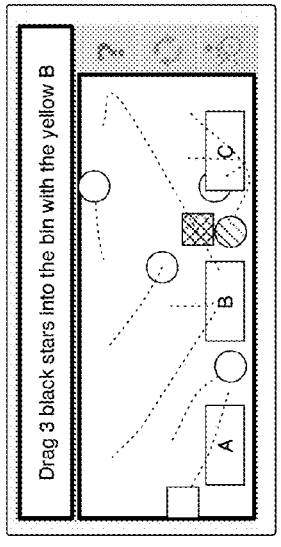
Figure 5A:
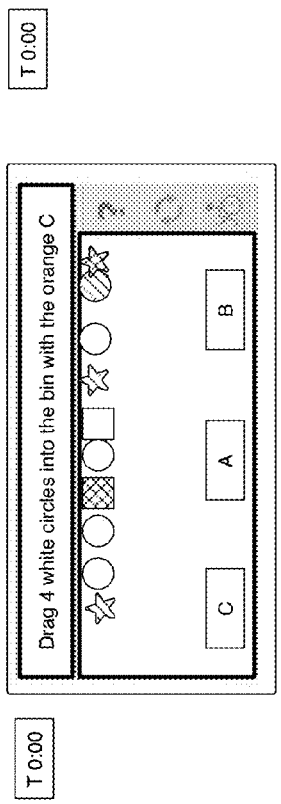
FIGS. 5A, 5B, and 5C are schematic representations of a CAPTCHA of the preferred embodiment at various time intervals.

As shown in FIG. 2, the object 194 depicted within the graphical interface 193 preferably moves therein following initiation of the CAPTCHA, and the user is preferably required to manipulate or interact with the object 194 to compete the CAPTCHA. As shown in FIGS. 5A and 6A, two different CAPTCHAs, including the same object 194 and additional object 195 within the same graphical interface 193 and the same prompt 191, may require substantially different user interactions to complete the CAPTCHA despite the initial (T 0:00) similarities between the two CAPTCHAs. Therefore, the step of pseudorandomly assigning a characteristic to the object 193 of the CAPTCHA may have the benefit of increasing the difficulty for automated software to solve the CAPTCHA.

Other elements of the CAPTCHA may also be haphazard, randomly generated, pseudorandomly generated, or otherwise seemingly irregular. Such other elements may be the prompt 191 (e.g., task, instruction, or challenge) of the CAPTCHA, the type of CAPTCHA (e.g., the game format), the shape of the graphical interface 193, the type of user interaction or input, or any other aspect of the CAPTCHA. In a first example, the CAPTCHA of FIG. 3F, including the graphical interface depicting four white circles, three hashed stars, an "A" bin, and a "B" bin may be pseudorandomly assigned any of the following prompt 191: (1) drag the white circles into the "A" bin; (2) drag the white circles into the "B" bin; (3) drag the hashed stars into the "A" bin; (4) drag the hashed stars into the "B" bin; (5) drag one hashed star and one white circle into the "A" bin; (6) drag one hashed star and one white circle into the "B" bin; (7) drag two hashed stars and one white circle into the "A" bin; (8) drag one hashed star and two white circles into the "B" bin; (8) drag one hashed star into the "A" bin and one white circle into the "A" bin; etc. Furthermore, additional objects 195 (e.g., bins, circles, squares, stars, triangles, etc.) and/or colors may significantly increase the number of potential prompts associated with the CAPTCHA. In a second example, the CAPTCHA may be randomly selected from a set of generic CAPTCHA formats, such as from any of the formats depicted in FIGS. 3A-3H, including Draw, Complete (Fill In), Build, Knock Down (Topple), Score, Drag, and Survey, or other formats including Move, Paint, Hammer, Shoot, Navigate, Destroy, Select, and Drop. In a third example, the requisite user input shifts between any of a cursor movement, a mouse click, a keystroke, a voice command, a touch, a facial expression, a gesture, or any other relevant user input or combination of user inputs.

The various aspects, elements, and characteristics of the CAPTCHA may provide a plethora of variables by which a substantially unique CAPTCHA may be generated for the user, wherein the CAPTCHA is still substantially easy for a human to complete but substantially difficult for automated software to complete, such as with current methods of automated CAPTCHA solvers.

The CAPTCHA is preferably an object-based problem and provides a visual challenge to the user that requires user interaction with the object 194. The object-based problem preferably includes a prompt 191 (shown in FIG. 2) that instructs the user how to complete the CAPTCHA; the prompt 191 may be text-based, but may also be audio- or graphic-based or provided via any other suitable media. In some cases, the prompt 191 may rely upon well-understood principles, and in some variations may be inherent in mechanics of the game, challenge, or survey defining the CAPTCHA. For example, the prompt 191 may instruct the user to navigate a maze while collecting prizes and avoiding enemies therein (shown in FIG. 3E). This example may incorporate a wide variety of images of objects that a human would interpret as prizes (e.g., images of coins, ice cream, toys) and as enemies (e.g., monsters, aliens); such contextual analysis may be extremely difficult for automated bots to complete. In an example of the CAPTCHA that is a survey, exemplified in FIG. 3H, the prompt 191 may ask the user to select a preferred Chevrolet Camaro from a list of Camaros, including a bittersweet red Camaro, a cherry red Camaro, a burgundy Camaro, a fire engine red Camaro, a rose Camaro, and a rusty Camaro; in this example, any selection of the rusty Camaro may be deemed an incorrect answer, and any other selection may be added to a database of user preferences or survey results. However, the prompt 191 may be of any other suitable type or form.

The user preferably provides a user input, through the graphical interface 193, to achieve the user solution to the CAPTCHA (the user input is preferably tracked within the graphical interface 193). The user input is preferably one of a mouse interaction, a touch interaction, a joystick interaction, an arrow interaction, a gesture, a facial expression, a voice command, and/or any other suitable non-text-based form of navigation. Such forms of interaction are preferably multidimensional in that they require a user interaction beyond discrete inputs (e.g., transcribing text, single keystrokes). For example, a mouse or cursor input may provide a directional input along two axes, a mouse state, and timing input (e.g., cursor speed), whereas keystrokes provide only the state of a key and the timing of the keystroke. The multidimensional aspect of the user input is preferably captured in Block 120 and analyzed in Block 150 to provide human and/or automated software indicators distinct from the user solution. The indicators preferably provide a second analytic by which to verify that the user is human. In a first example, the multidimensional aspect includes a cursor path completed by the user in the process of fulfilling the CAPTCHA; if the path is substantially geometric (e.g., comprises straight and arcuate lines) the indicators suggest that the user is inhuman because a typical human is unlikely to complete such geometric input motions. In a first variation of this first example, if the input path is substantially without noise, or the noise is substantially greater than or less than input noise typical of a human user, then the indicators suggest that the user is inhuman; this variation and others may require Fourier analysis of the input path and/or any other relevant mathematical manipulation thereof to isolate a characteristic of the user input. In a second variation of the first example, if the input path includes substantially geometric input changes, such as from a linear path to an arcuate path or from a substantially horizontal direction to a substantially vertical direction without typical lag, inaccuracy, or noise, the indicators suggest that the user is inhuman. In a second example, the multidimensional aspect includes a timing element of the user input, wherein the indicators suggest that the user is inhuman if the input velocity is substantially faster or slower than the input velocity of a typical human. In a first variation of the second example, if the user begins the task too soon after (or too long after) initiation of the CAPTCHA, the indicators suggest that the user is inhuman. In a second variation of the second example in which the CAPTCHA includes the object 194 that is moving, the indicators suggest that the user is inhuman if the cursor input does not lag the motion of the object 194 within a range that is typical of a human user. However, the multidimensional aspect of the user input (user interaction) may be of any other type and may be used in any other way to determine human and/or automated software indicators.

The object 194 is preferably a graphical representation depicted within the user graphical interface 193 but may be any suitable representation of an element or tangible object 194; a plurality of objects may also be depicted within the graphical interface 193. In one example, the object 194 is a colored shape such as a blue circle or a yellow triangle. In another example, the object 194 includes a real-life image such as an image of an ocean or of a boat. The object 194 is preferably crucial to solving the CAPTCHA, though the object 194 or any additional object(s) 195 may be excessive and unnecessary to completing the CAPTCHA, thus serving to distract the user. As mentioned above, the object(s) may leverage contextual or inherent properties of the associated image to communicate to a human a particular or inherent meaning; automated software may lack such contextual understanding, which may result in a CAPTCHA that is substantially easy for a human to solve but difficult for automated software to complete.

As mentioned above, an option to change to an accessible version of the object-based CAPTCHA may provide an alternative version thereof for blind or disabled users. This alternative challenge preferably includes an audio prompts to create an interactive audio-based CAPTCHA, but the challenge may also implement vibratory or tactile feedback or any other mechanism to present the CAPTCHA (and the challenge thereof) to the user.

The CAPTCHA prompt 191 may further be a dynamic prompt, the correct solution(s) to the CATPCHA changing with the prompt 191. For any given configuration of the challenge area 192 (e.g., a characteristic or setting of the objects 194, 195) a plurality of generic prompts may be available for selection prior to initiation of the CAPTCHA. For example, in the challenge area 192 of FIG. 2, the following generic prompt types may be available: "Build a rectilinear bridge across Box A and Box B;" "Stack two squares and a star on Box C;" and "Drag four white circles into the C bin." Also or alternatively, a plurality of CAPTCHA template prompts, each with at least one variable, may be available for a given generic CAPTCHA format. For example, a template prompt includes "Drag N $C_1$ O into the $C_2$ bin," wherein N: number, $C_1$: color of the object, O: object, and $C_2$: color of the bin. In this variation, the type of object to drag (e.g., circle, square, star, octagon, etc.), the number of those objects to drag, and/or the destination of the object(s) (e.g., where to drag an object) may define the variables of the prompt 191. Each prompt 191 may have an associated type of challenge area(s), though the prompt 191 may be included in any other number of prompt templates and the prompt 191 may include any other number of variables. The dynamic prompt 191 preferably functions to introduce significant variability in the objective of the CAPTCHA.

The graphical interface 193 of the CAPTCHA may also include additional dynamic objects 195 (or other elements) within the challenge area 192; these additional dynamic objects 195 preferably provide additional variability amongst such CAPTCHAs and thus increase the number of possible unique CAPTCHAs with unique solutions. Preferably, the additional dynamic objects 195 also move within the challenge area 192; motion of the additional dynamic objects 195, with the object 194, may encourage more complex user interactions within the graphical interface 193. In one variation, a physics engine controls interactions between the object 194, the additional dynamic objects 195, the challenge area 192 (e.g., the perimeter of the graphical interface 193), and/or the user (e.g., a cursor); the physics engine may therefore function to require the user to understand complex inter-object interactions. Furthermore, may change over time within the CAPTCHA: the representation of the object 194 and the additional dynamic objects 195; the number of instances of a type, shape, color, context, speed, and/or direction of motion of the object 194 and/or additional dynamic object 195; a game play mechanic; an interaction parameters such as friction or gravity; or any other suitable aspect or characteristic of the CAPTCHA.

The challenge area 192 depicted within the graphical interface 193 may also be dynamic, wherein the challenge varies in size, shape, orientation, and/or position within the graphical interface 193 from one CAPTCHA to the next, thus functioning to further increase variability amongst such CAPTCHAs.

The object 194, additional dynamic objects 195, other objects or elements depicted within the graphical interface 193, the challenge area 192, and/or any other aspect, characteristic, or elements of the CAPTCHA may also be themed. A theme for the CAPTCHA may provide context for the CAPTCHA and/or imply the prompt 191 for the CAPTCHA. The theme may also provide an avenue for the publisher of the CAPTCHA, an external advertiser, or any other third party to customize the CAPTCHA to deliver an advertisement or other message to the user. Such third-party theming (or branding) of the CAPTCHA may provide a vehicle by which CAPTCHAs may be customized, thus increasing the diversity and uniqueness of CAPTCHAs, while furnishing an engaging medium for users to view advertisements. Because the user may be actively engaged in completing the CAPTCHA that includes an advertisement, the advertisement within the CAPTCHA may have a greater impact on the user than current web- and mobile application-based advertising strategies. A software development kit (SDK) for the CAPTCHA and related service are preferably provided to the publisher, external advertiser, or other third party for use in: adding assets (e.g., marketing material) to existing CAPTCHAs; adding assets to generic CAPTCHA formats; customizing CAPTCHAs; creating unique CAPTCHAs and/or generic CAPTCHA formats; modifying and/or defining correct solutions to CAPTCHAs; adjusting the threshold likeness score; or for any other suitable purpose. CAPTCHAs and/or changes to existing CAPTCHAs may be automatically tested and/or integrated within the server configured to provide the CAPTCHA. The SDK is preferably provided via a dashboard accessible by the publisher (or representative thereof) or via a web-based application or program, though the SDK may be provided in any other form.

Block S110 of the preferred embodiment, including receiving the user solution to the CAPTCHA, functions to capture the result of the CAPTCHA, provided by the user, for subsequent comparison to a correct solution of the CAPTCHA. Block S160, including calculating the human likeness score, preferably accounts for the user solution to the CAPTCHA, since analysis of the user interaction pattern alone may not adequately inform the human likeness score. The CAPTCHA is preferably substantially easy for a human user to complete and substantially difficult for automated software to complete, preferably due to the context of objects depicted within the CAPTCHA, variability within the CAPTCHA, object-specific prompts, and/or other characteristics of the CAPTCHA described above. The user solution, when compared to a correct solution for the CAPTCHA in Block S140, may therefore present a significant indication of the humanness of the user. The user solution is preferably captured by the publisher presenting the CAPTCHA and then transmitted to the server for subsequent analysis and manipulation in Blocks S140 and S160, as shown in FIG. 4. However, the user solution may be captured by any other associated entity, such as the website or application hosting the CAPTCHA or directly by the server; the user solution may also be transmitted to any relevant entity for such analysis and manipulation.

Figure 3A:
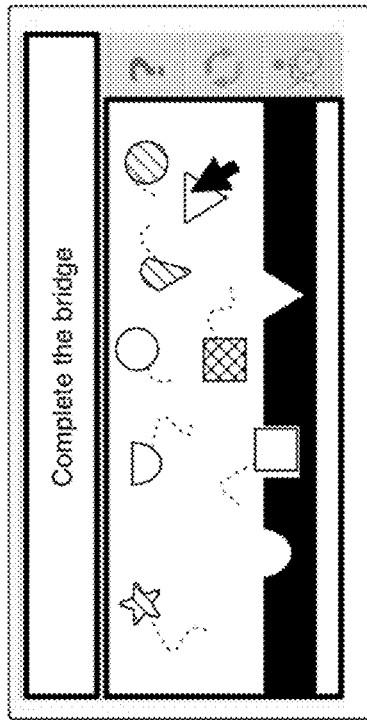
FIGS. 3A-3H are schematic representations of exemplary game-like CAPTCHAS of the preferred embodiment.
Figure 3C:
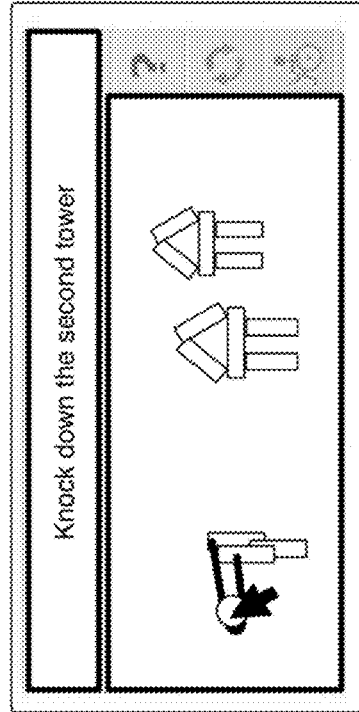
Figure 3B:
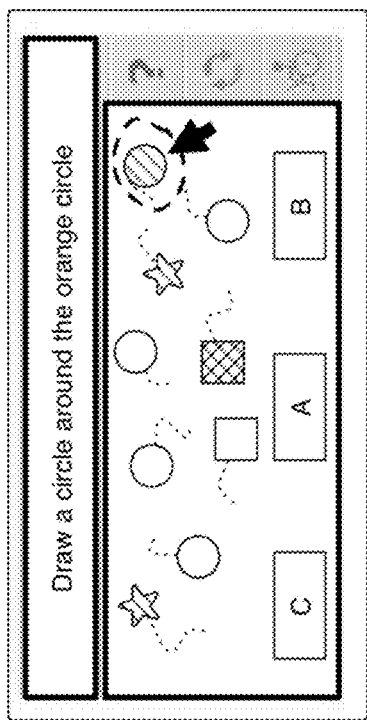
Figure 3D:
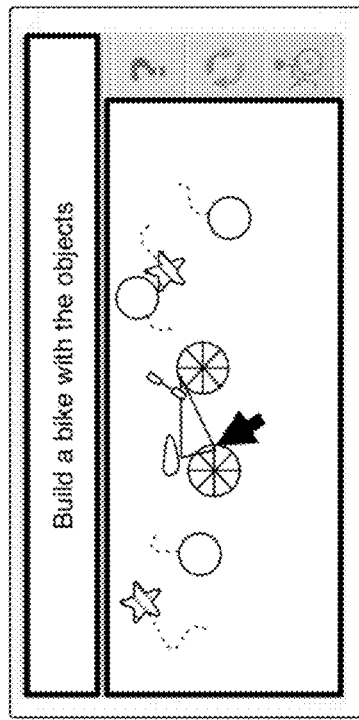
Figure 3E:
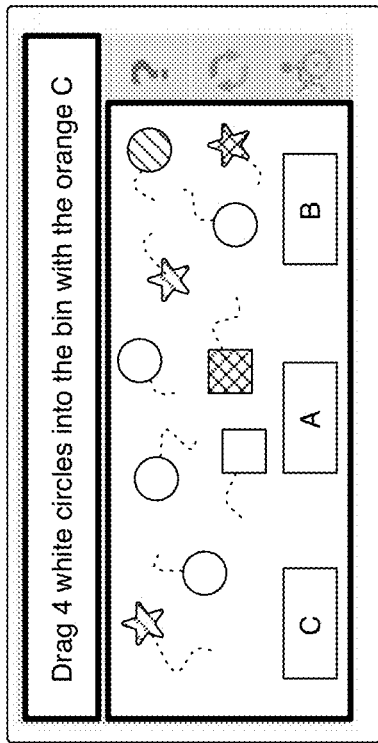
Figure 3G:
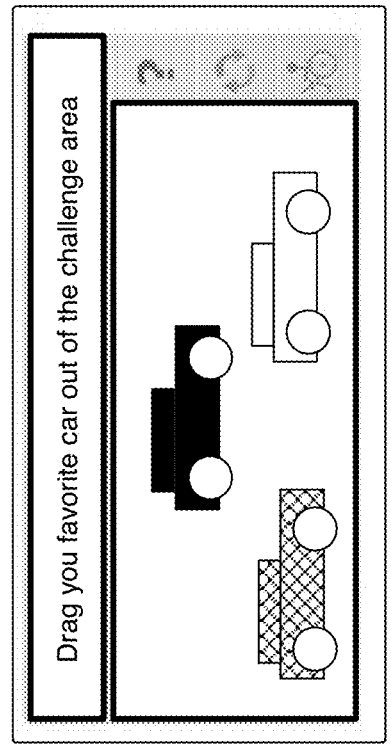
Figure 3F:
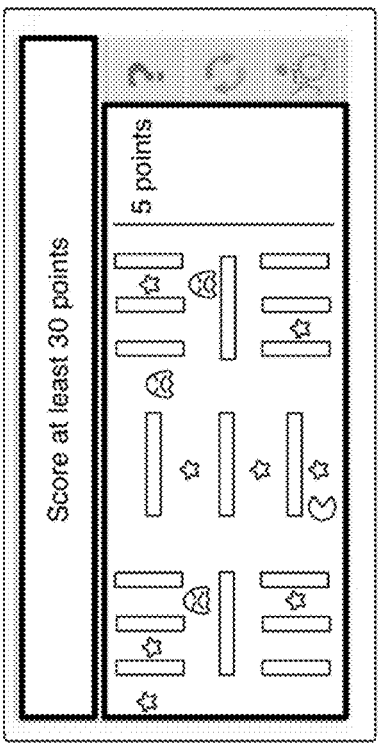
Figure 3H:
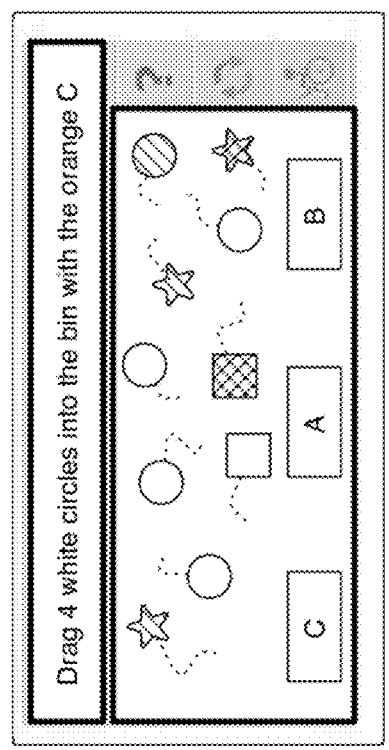
Figure 5B:
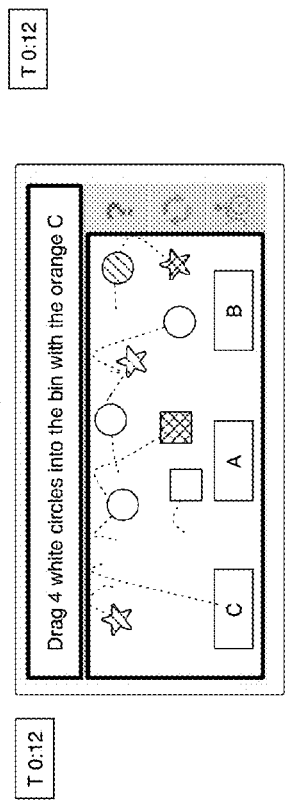
Figure 5C:
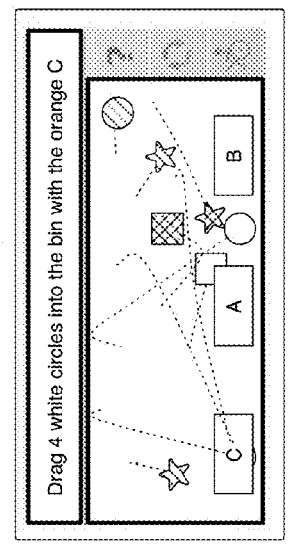
Figure 7C:
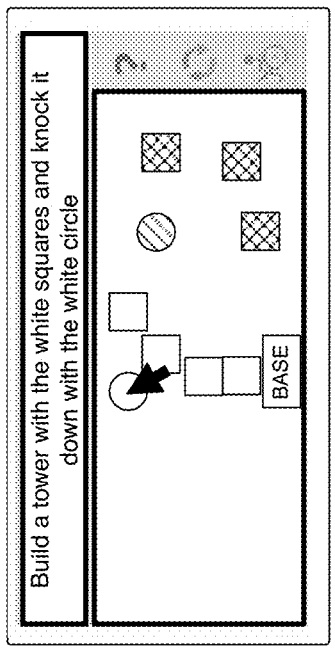
FIGS. 7A, 7B, 7C, and 7D are schematic representations of a CAPTCHA of the preferred embodiment at various time intervals.
Figure 7D:
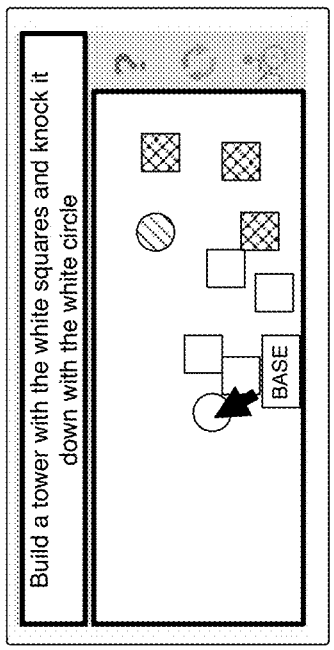
Figure 7A:
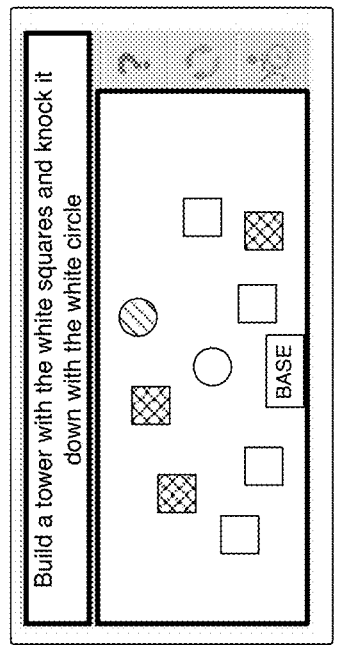
Figure 7B:
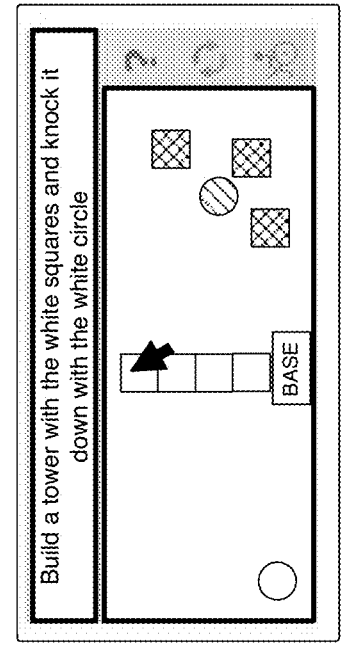

The user solution preferably includes the state of the CAPTCHA upon completion thereof by the user. Cessation of the CAPTCHA may be automatic, wherein the CAPTCHA ceases following a solution provided by the user or expiration of specified game time; alternatively, cessation of the CAPTCHA may be manual, wherein the CAPTCHA ceases only following a specific input by the user, such as a user selection of a "Submit" button or a "Finished" button. The user solution is also preferably distinct from the user interaction or user interaction pattern. Specifically, the user interaction is preferably any portion of a user interaction within the CAPTCHA, graphical interface, or challenge area prior to completion of the CAPTCHA. The user solution is preferably the state of the CAPTCHA upon completion thereof, but may also include additional states or instances of the CAPTCHA prior to completion thereof. In a first example shown in FIGS. 5A, 5B, and 5C, the prompt of the CAPTCHA is "Drag four white circles into the bin with the orange C;" at twelve seconds (T 0:12), the user drags a first white circle into the orange bin; at fourteen and eighteen seconds (T 0:14, T 0:18), the user drags a second and third white circle into the orange bin; and at twenty-one seconds, the user drags a fourth white circle into the orange bin. In this first example, the user solution is preferably four white circles dragged into the orange bin, despite the fact that the white circles were dragged into the orange bin at separate times. In a second example shown in FIGS. 7A, 7B, 7C, and 7D, the prompt of the CAPTCHA is "Build a tower with the white squares and knock it down with the white circle;" the user builds a tower with the white squares by nineteen second (T 0:19); and the user drags the white circle over the tower to knock the tower down at twenty-three and twenty-seven seconds (T 0:23, T 0:27). In this second example, the user solution preferably includes an instance of the constructed tower and at least two instances of the circle knocking down the tower. In a third example implementing a Pac-Man-like game, as shown in FIG. 3E, the user solution preferably includes: the final score achieved by the user; each instance in which the user captures a dot or power pellet; and each instance in which a ghost meets the user. However, the user solution may be of any other type and include any other information relevant to the CAPTCHA.

Block S110 of the preferred embodiment, including receiving the user interaction pattern descriptive of an interaction undertaken by the user, through the graphical interface, to achieve the user solution, functions to capture an input of the user for subsequent comparison against interactions of other users indicative of human and/or automated software characteristics of the user. Block S160, including calculating the human likeness score, preferably accounts for the user interaction pattern, since analysis of the user solution alone may not adequately inform the human likeness score. The CAPTCHA preferably requires a user interaction that is distinct from the user solution, such as a cursor movement, a mouse click, a keystroke, a voice command, a touch, a facial expression, a gesture, or any other relevant user input that is not an instance specific to a solution of the CAPTCHA. For example, a purely text-based CAPTCHA that requires the user to type in the words depicted in a distorted image, wherein the user interaction is solely keystroke-based, may not provide a vehicle by which to capture the user interaction (although, in some variations, the timing of a user keystroke may define the user interaction of the CAPTCHA of the preferred embodiment). However, a CAPTCHA requiring a cursor or touch input (or other multidimensional input), such as the CAPTCHA shown in FIGS. 3A-3H, may provide an appropriate vehicle by which to capture the user interaction. In a first example, the user interaction is a portion of the cursor path shown in FIG. 1. In a second example, an image of something typically considered funny is first presented, within the graphical interface of the CAPTCHA, to the user; an image of something that is sad is subsequently presented; the user interaction is a facial expression of the user (e.g., captured by a camera incorporated into the digital device), wherein a user solution in line with a correct solution includes a first facial expression that is a smile and a second facial expression that is a frown or wince substantially soon after the first and the second images are released to the user. However, the user interaction may be of any other form and captured in any other way.

The user interaction is preferably captured within the graphical interface of the CAPTCHA, such as in the variation in which the user interaction is a touch or cursor motion within the graphical interface and provided via a mouse, touchpad, touch screen, trackpad, joystick, game controller, or other user input device. In this variation, the user interaction may be captured by the publisher presenting the CAPTCHA, by the website or application hosting the CAPTCHA, the server generating the CAPTCHA and/or calculating the human likeness score, or any other associated entity. Alternatively, a peripheral device in communication with the digital device, such as a camera (integral with or plugged into the digital device), a digital wristband (e.g., the Jawbone UP), a cell phone with an integral accelerometer or gyroscope, a gaming console, or any other suitable peripheral device, may be accessed by the publisher, website, application, server, and/or other associated entity to track and capture the user interaction.

The user interaction is preferably captured by the publisher presenting the CAPTCHA and then transmitted to the server for subsequent analysis and manipulation in Blocks S150 and S160, as shown in FIG. 4. However, the user interaction may be captured by any other associated entity, such as the website or application hosting the CAPTCHA or directly by the server; the user interaction may also be transmitted to any relevant entity for such analysis and manipulation.

Figure 8A:
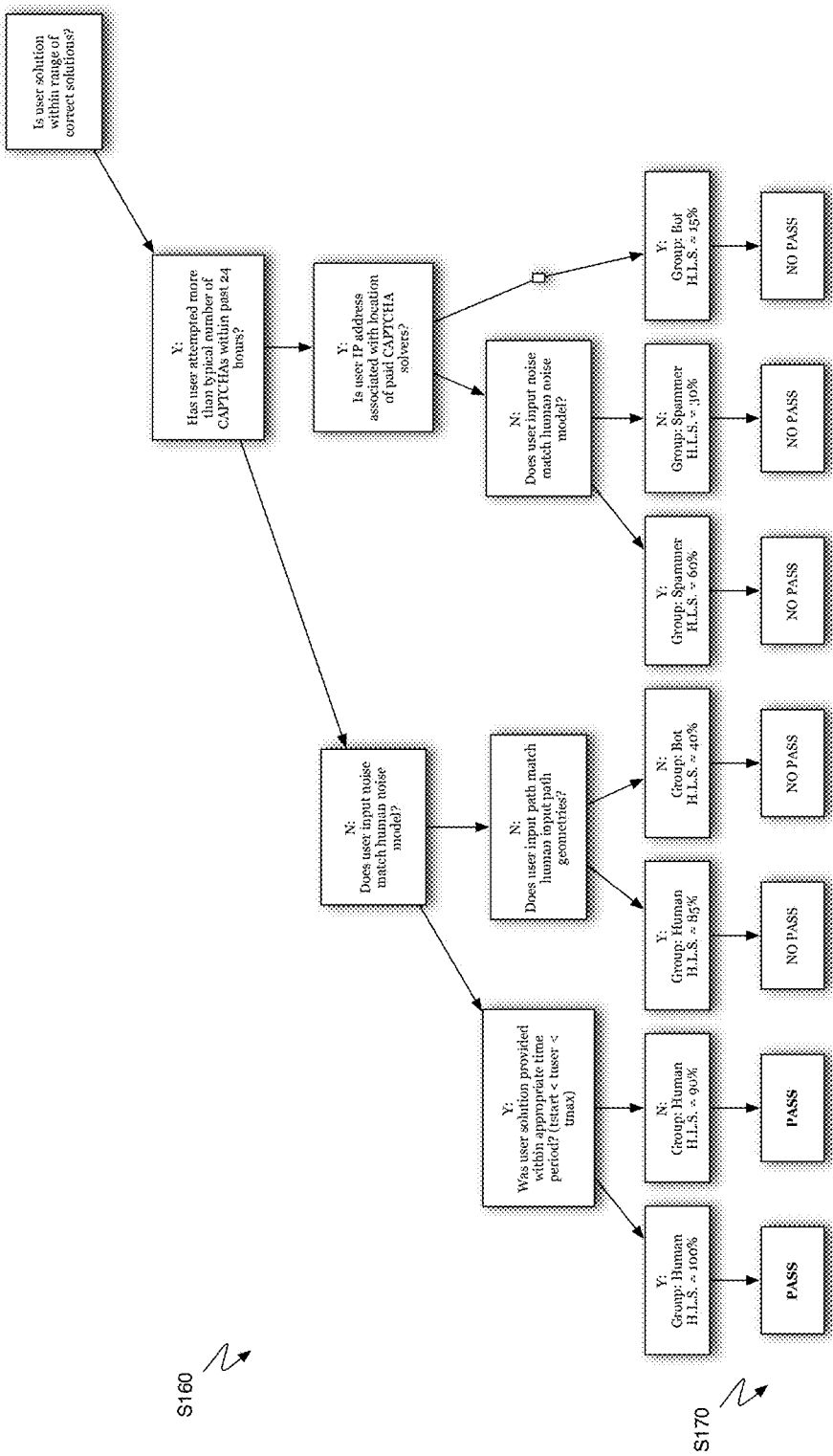
FIGS. 8A and 8B depicts a decision tree for completing a block of the preferred embodiment.
Figure 8B:
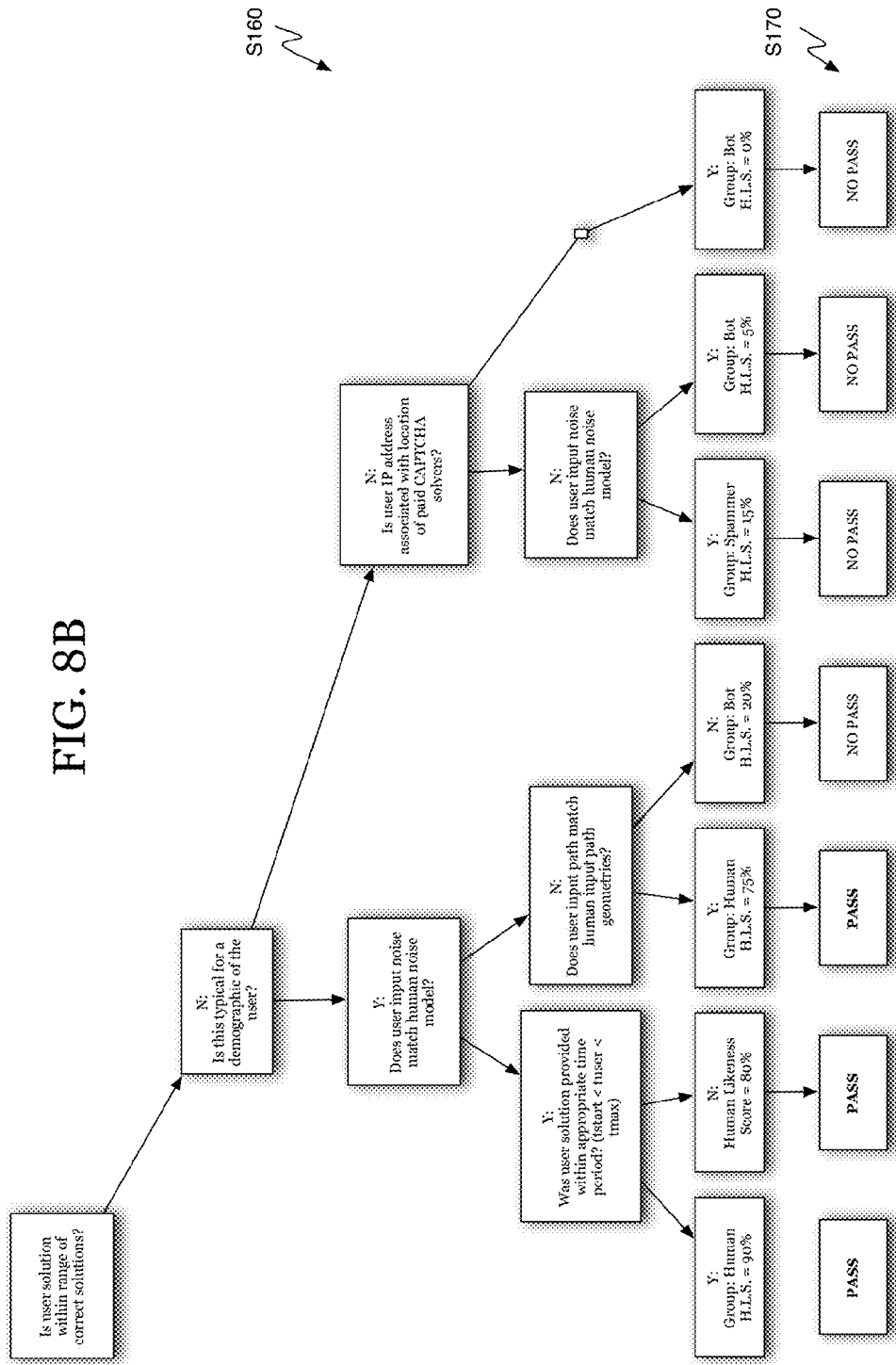
Figure 9D:
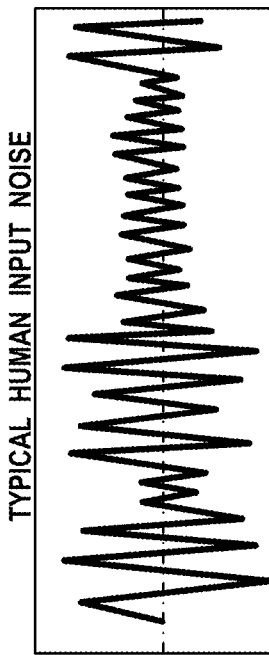
FIGS. 9A-9E depict a user input path, an average user input path, the noise in the user input path, noise in a typical human input path, and noise in a typical automated software input for a block of the preferred embodiment.
Figure 9E:
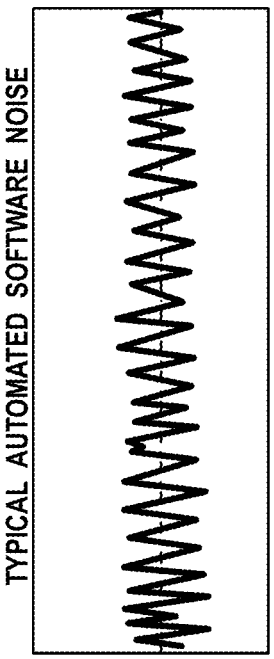
Figure 9A:
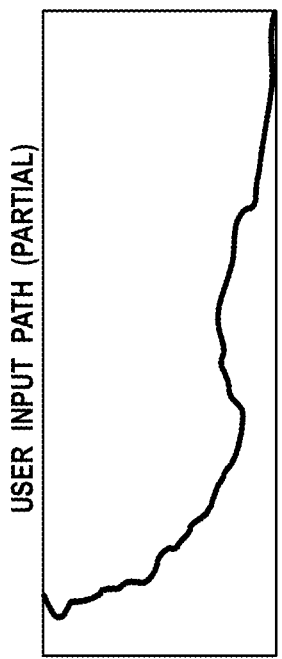
Figure 9B:
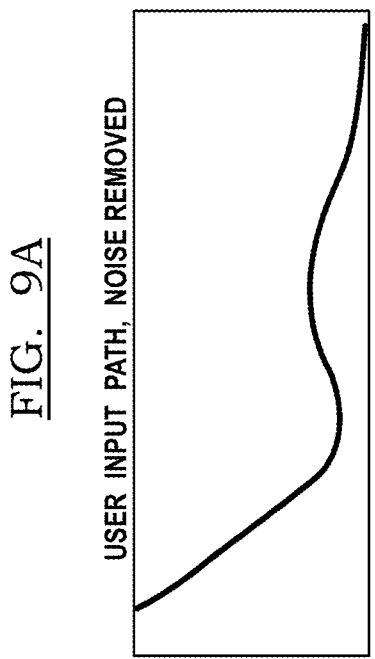
Figure 9C:
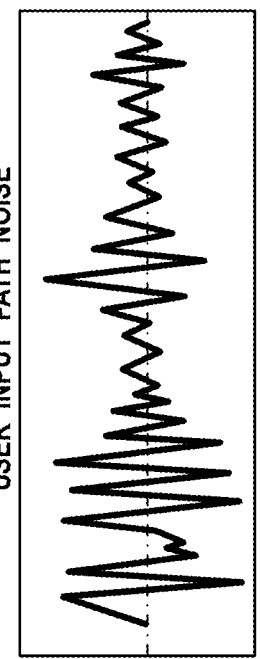

The method S100 may further comprise the block of receiving user data that is distinct from the CAPTCHA S130. Block S160, including calculating the human likeness score, preferably accounts for the user solution and the user interaction pattern in calculating the human likeness score; however, Block S160 may also incorporate user data to further inform the human likeness score. In a first variation in which the user data includes a CAPTCHA (or indication thereof) previously presented to the user, the data may indicate how many CAPTCHAs the user has attempted in a given period of time. In a first example, more that 100 attempted CAPTCHAs within a twenty-four-hour period indicates that the user is automated software as this is uncharacteristic of a typical human user. In a second example, a previous CAPTCHA that was failed by the user suggests that the user may be inhuman, and the subsequent CAPTCHA selected for the user is substantially more difficult for automated software to complete that the prior CAPTCHA. In a second variation, the user data includes an Internet Protocol (IP) address of the user. In a first example of the second variation, if the user IP address is associated with a location in which humans are historically paid for solving CAPTCHAs (e.g., India and China), the user data is used to select a more difficult CAPTCHA or to reduce the human likeness score of the user, as shown in FIGS. 8A and 8B. (In this example, the human likeness score may be considered 'an appropriate user score' rather than a human likeness score since, although a paid human solver is still human, such paid human solvers (e.g., human spammers) may not be considered appropriate users and a service employing such CAPTCHAs may desire to restrict access to such paid human solvers.) In a third variation, the user data is a cookie associated with the user. In a first example of the third variation, as shown in FIG. 1, a plurality of user cookies are used to determine if the user has accessed a website in a manner typical of a human, such as by searching for and accessing the website through Google. In a second example, timestamps may be gleaned from user cookies to determine if usage is characteristic of a human (e.g., the user sleeps and is not at a computer for more than twenty-four hours at a time). In a third example, user cookies indicate that the user visits other websites that do not require user completion of CAPTCHAs, which suggests that the user is not automated software. The user IP address and/or user cookie may also be used to link the user to past CAPTCHA attempts, to link the user to a previous human likeness score, and/or to ascertain whether the user was previously determined to be human. In a fourth variation, a social networking account (e.g., Facebook account) of the user may be accessed and data siphoned therefrom. In a first example, the age and friends of the user are compared to a list of favorite music and books of the user to determine if the interests of the user match the age or demographic of the user, wherein a mismatch suggests that the user is an automated script (and that the social network account is falsified). In a second example, the demographic of the user is siphoned from the account of the user to determine a demographic of the user, such as age, race, gender, nationality, education level, existing disabilities or handicaps, field of employment, etc., which may be subsequently used in Block S150 in the comparison of the user interaction pattern to interaction patterns of previous users. However, any other user data may be collected and used in any other way.

The publisher, the host website or application, or the server may capture the user data and the user data may be transmitted between any relevant parties for subsequent analysis in Block S155.

Block S140 of the preferred embodiment, including determining the accuracy of the user solution, functions to determine if the user solution is correct and/or falls within a range of acceptable (e.g., correct) solutions to the CAPTCHA. As mentioned in a preceding section, Block S160, including calculating the human likeness score, preferably accounts for the user solution to the CAPTCHA, since analysis of the user interaction pattern alone may not adequately inform the human likeness score. Because the CAPTCHA is preferably substantially easy for a human to complete and substantially difficult for automated software to complete, the accuracy of the user solution is preferably ascertained in Block S140. In a first variation in which the CAPTCHA has a single correct solution, the user solution may be compared thereto. For example, for a CAPTCHA with the prompt "Click 'Finished' after dragging one black circle into the yellow bin," the user solution is determined to be correct only if the user drags a single black circle into the black bin prior to clicking "Finished," and the user solution is determined to be incorrect if the user drags two black circles into the yellow bin or drags one yellow circle into the black bin. In a second variation in which the CAPTCHA has a range of correct solutions, Block S140 preferably determines if the user solution falls within the bounds of correct solutions. In a first example of a CAPTCHA with the prompt "Drag two black circles into the yellow bin," the user solution is determined to be correct regardless of which black circle is dragged into the yellow bin first. In a second example of a CAPTCHA with the prompt "Build a tower from the squares and then knock it down with the white circle," if the user completes the prompt, the user solution is determined to be correct regardless of where the tower is constructed within the graphical interface, the order in which the squares are arranged to construct the tower, the color of the squares, or which square is hit first with the circle when the user topples the tower. However, in this example, if the user employs a yellow circle to topple the tower, or the user adds a triangle to the tower, the user solution is preferably deemed outside the bounds of a correct solution and therefore improper. However, the user solution may be analyzed in any other way.

Figure 10A:
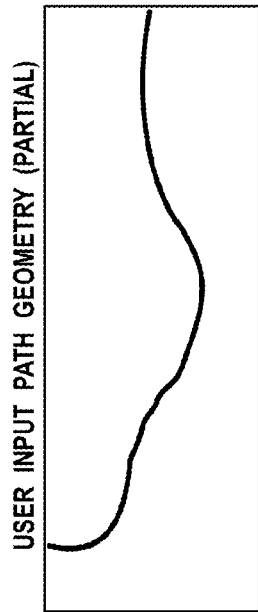
FIGS. 10A-10C depict a user input path geometry, a typical human input path geometry, and a typical automated software input geometry for a block of the preferred embodiment.
Figure 10B:
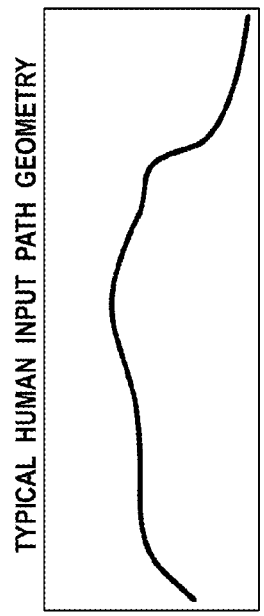
Figure 10C:
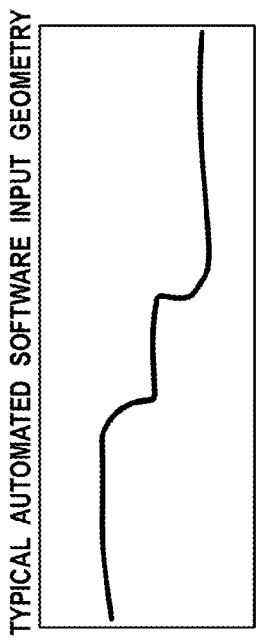
Figure 11:
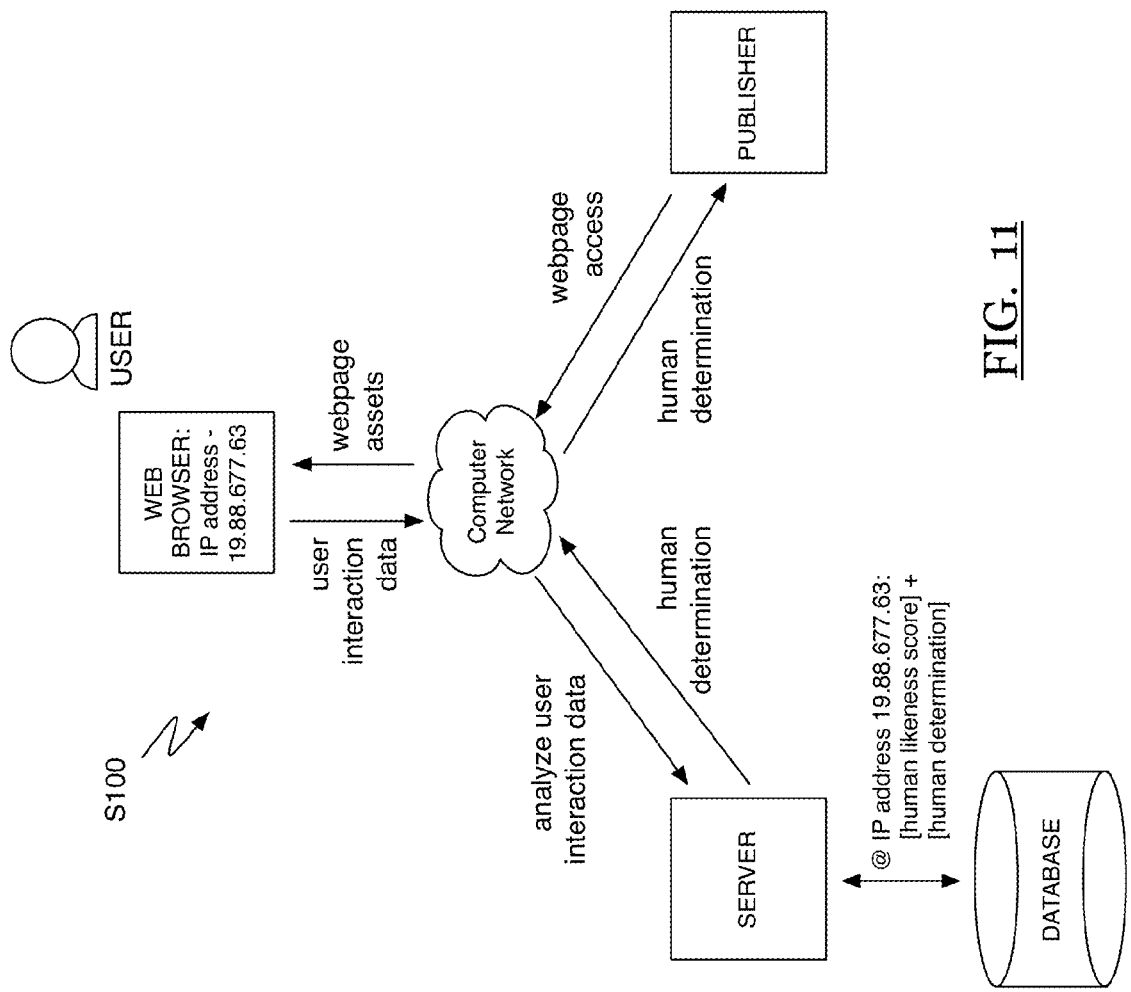
FIG. 11 is a flowchart representation of one variation of the method.

Block S150 of the preferred embodiment, including comparing the user interaction pattern against an interaction model generated from interaction patterns of previous users, functions to isolate characteristics of the user interaction that are indicative of a human user and/or an automated user. The user interaction is preferably any of the aforementioned user interactions, such as a cursor or touch motion, and the user interaction pattern is preferably a portion of the user interaction. The user interaction pattern may be a snippet of the user interaction, such as a particular section of a cursor path provided within the graphical interface (e.g., a portion of the cursor path shown in FIG. 1) or the geometry of the input path (e.g., the angle of a direction change or the linearity of a portion of the input), as shown in FIGS. 10A-10C; alternatively, the user interaction pattern may be a characteristic of a portion or the entirety of the input path, such as average noise in the input path, the length of the input path, the average speed of the input, or where along the input path a mouse click is generated. However, the user interaction pattern may be of any other characteristic of the user interaction.

In a first variation, the user interaction is a path-type input (e.g., a cursor or touch motion) and the user interaction pattern is noise in a portion of the input path; the noise may be oscillations or deviations from a smooth input path, and Block S150 may include comparing the input path noise to input noise typical of a human or comparing the signal-to-noise ratio of the input path to a signal-to-noise ratio typical of a human, as shown in FIGS. 9A-9E. In this example, Block S150 may therefore calculate a human likeness score of the user based on a degree of similarity between the signal-to-noise ratio—characteristic of the user input—and the model signal-to-noise ratio pattern defined in the interaction model. In a second variation, the user interaction is a path-type input provided through the graphical interface and the user interaction pattern is a direction change in a portion of the input path; Block S150 may include comparing the direction change of the input path to a direction change typical of a human interaction within the graphical interface. In a third variation, the user interaction is a path-type input and the user interaction pattern is an input velocity of a portion of the input path; Block S150 includes comparing the input velocity to an input velocity typical of a human interaction within the graphical interface. In a fourth variation, the user interaction pattern is a characteristic of a response to a moving object within the graphical interface; Block S150 includes comparing the user response with a characteristic of a response typical of a human interaction within the graphical interface. In this fourth variation, the characteristic of the response may be any of: a lag in direction change of an input relative to a direction change of the moving object (e.g., moving a Pac-Man-type figure within the graphical interface following a change of direction of a moving ghost therein); an input path leading up to selection of the moving object (e.g., the user attempting to catch a moving object within the graphical interface); an input path following release of the moving object (e.g., an input path including dragging an object into a bin); input timing following a change in distance between the object and a second object depicted within the graphical interface (e.g., a change of input following collision of two objects within the graphical interface); or any other relevant characteristic of the user interaction. In a fifth example in which the user interaction is a voice command, the user interaction pattern is voice inflection; the inflection provided by the user is compared against typical human voice inflections. In a sixth example, the user interaction is a facial expression and the user interaction pattern is the transition from one expression to another; the transition is compared against typical transitions by known humans, such as the stretching and wrinkling of skin around the eyes and cheeks (and the timing thereof) as the user begins to smile. However any other user interaction pattern of any other user interaction may be compared against any interaction model (e.g., a typical characteristic or behavior of a known human or of known automated software).

The interaction model preferably comprises characteristics and/or behaviors of users of known types (e.g., humans and/or automated scripts). The interaction model preferably includes data generated by at least one user that was/is a known human, such as input noise, input direction change, input speed or velocity, a response to a moving object, a voice inflection, a facial expression, or any other relevant characteristic of a human, and the interaction preferably include data generated by a plurality of known humans, such as ten, 100, 1000, or 10,000 known humans. However, the interaction model may also or alternatively include data generated by at least one user that was/is a known "bot" (automated software). The data is preferably stored in a database accessible by the server (or other entity completing Block S160), and the interaction model preferably comprises at least one isolated characteristic that is typical of a human user. However, the interaction model may define any number of typical human characteristics, and all or a (pseudorandomly selected) portion of the defined characteristics in the interaction model may be compared against the user interaction pattern in Block S150. The interaction model is preferably generated from user interactions of previous users to whom similar CAPTCHAs have been presented, but may alternatively be from user interactions of users accessing websites or applications not presenting CAPTCHAs to the users. In one example, a high-traffic website, such as Google.com, captures cursor movements on the Google homepage; these cursor motions are then be used, at least in part, to define the interaction model, even though CAPTCHAs are not typically presented on the Google homepage. Alternatively, the interaction model may be synthetic. For example, the interaction model may consist solely of computer code that defines a user interaction characteristic expected of human or automated users.

The interaction model may be static, wherein, once the typical human characteristic(s) is defined therein, the interaction model does not change. However, the interaction model may alternatively be dynamic, wherein subsequent user interactions from subsequent CAPTCHAs presented to a variety of users may be added to the interaction model. This may have the benefit of providing a more complete interaction model that accounts for human users of a wider variety of demographics. For example, teenage users may provide significantly faster input speeds and provide a solution to CAPTCHAs significantly faster than sexagenarians. A demographic of the user (such as determined in Block S130) may thus isolate a portion of the interaction model such that the user interaction is compared against user interactions of previous users in a demographic similar to that of the user, and this may have the benefit of improving the accuracy of the comparison of Block S150, the calculated human likeness score of Block S160, and/or the verification that the user is human (Block S170); this in depicted in FIGS. 8A and 8B. However, the user interaction and/or user interaction pattern is preferably added to the dynamic interaction model only if the service managing the interaction model (e.g., the server) is substantially confident that the user is human. For example, the user interaction pattern may only be added to the interaction model if the human likeness score is (substantially) greater than a threshold likeness score, wherein a human likeness score greater than the threshold likeness score is indicative of substantial confidence that the user is human.

The interaction model is preferably generated, maintained, and/or updated by the server. However, any other entity may administer the interaction model, such as the publisher, and the interaction model may be generated, manipulated, maintained, and updated in any other way.

Block S160 of the preferred embodiment, including calculating the human likeness score based upon the determination of Block S140 and the comparison of Block S150, functions to generate a value associated with confidence that the user is human (or automated software). The human likeness score is preferably a quantitative value included in a continuum of human likeness scores. In a first example, the continuum of human likeness scores includes 0 and all integers between 1 and 10, wherein a human likeness score of 9 reveals a relatively low confidence that the user is human and a human likeness score of 2 reveals a relatively high confidence that the user is human. In a second example, the human likeness score is a percentage, from 0% to 100%, wherein a human likeness score of 15.62% reveals a relatively low confidence that the user is human and a human likeness score of 9.17% reveals a relatively high confidence that the user is human. However, the continuum of human likeness scores may contain any other range and be of any other quantitative type. Furthermore, the continuum of human likeness scores may be qualitative. For example, the human likeness score may be selected from: "Definitely Not Human," "Highly Unlikely To Be Human," "Probably Not Human," "May Not Be Human," "Probably A Cyborg," "May Be Human," "Probably Human," "Highly Likely To Be Human," "Definitely A Human," and any other relevant qualitative descriptor.

As shown in FIGS. 8A and 8B, Block S160 may utilize a decision tree to calculate the human likeness score. Various disparate elements, such as any of the user solution, user interaction patterns including noise and input geometries, and user data including an IP address, may be accounted for within the decision tree to ultimately select an appropriate human likeness score. The decision tree may further aid in isolation of the user into a particular user group, such as automated software, human spammer, and human, as shown in FIGS. 8A and 8B. Subgroups of these groups may also be implemented, such as demographic subgroups for humans (e.g., age, race, gender, education level) or location subgroups for human spammers (e.g., United States, India, China). The interaction model preferably includes substantial data for each group and/or subgroup such that a user, once isolated into a group, may be compared against similar users in Blocks S140, S150, and/or S155. Human likeness scores may be adversely affected for users with characteristics, solutions, and/or data outside what is typical or outside a predefined bound or cutoff for a particular group or subgroup into which the users have been placed; this may yield the benefit of improving the accuracy of the human likeness scores and the determination of the category of user (e.g., human, spammer, automated script). These groups and/or subgroups may also be dynamic, wherein groups and/or subgroups are added or deleted as additional data is made available through additional completions of CAPTCHAs by users.

Alternatively, Block S160 may utilize a weighted average to calculate the human likeness score for the user. Each element of the user completion of the CAPTCHA, including the user solution, the user interaction(s), and/or the user data may be separately compared against the correct CAPTCHA solution, the interaction model(s), and/or typical user data; the separate comparisons may then be weighted (e.g., 50% for the user solution, 30% for the user interaction, and 20% for the user data; or all weighted equally) and combined into a single human likeness score. In one variation: Block S140 further includes generating a first confidence group based upon the user solution; Block S150 further includes generating a second confidence group based upon the user interaction pattern; and Block S155 further includes generating a third confidence group based upon the user data. In this variation, Block S160 further includes determining the reliability of the first, second, and/or third confidence groups. In one example of determining the reliability of a confidence group, though the user provides an incorrect solution to the CAPTCHA, the user is determined to be a 75-year-old male and the confidence group based upon the user solution is determined to be substantially less reliable in suggesting that the user is human than either of the user interaction or the user data. In a second example of determining the reliability of a confidence group, user data suggests that the user has attempted 107 CAPTCHAs in the previous eight hours, and this data is determined to be substantially more reliable in suggesting that the user is automated software (or a human spammer) than the user solution or the user interaction. Block S160 may thus include compiling the first, second, and/or third confidence groups, based upon the determined reliability thereof, to generate the human likeness score.

Furthermore, Block S160 may utilize artificial neural networks, support vector machines, inductive logic programming, or other methods enabling machine learning. However, the human likeness score may be generated in any other way and with any other data or combination of data. Furthermore, an automated software likeness score may be calculated in Block S160 in addition to or in place of the human likeness score; the automated software likeness score may be calculated in any suitable way, such as by the decision tree or weighed average methods described above.

The method S100 may further comprise Block S170, including comparing the human likeness score to a threshold likeness score. This comparison preferably indicates that the user is either a human or an automated script, but may also indicate that the user is a human spammer or that the user belongs to any other group to which access should be restricted or permitted. The threshold likeness score may be fixed, such as at 65%, wherein a human likeness score greater than or equal to 65% indicates that the user is human and a human likeness score less than 65% indicates that the user is either inhuman, a human spammer, or within another group with restricted or limited access. However, the threshold likeness score may be variable. In a first example, the threshold likeness score is modified on a daily basis in order to meet a quota of users determined to be human (and thus granted access). In a second example, the publisher of the CATCHA adjusts the threshold likeness score to meet the needs of the publisher or host website or application. In a variation of this second example in which the publisher is a government agency, the publisher may set the threshold likeness score, for a government website, particularly high at 90% in order to substantially prevent spammers and automated scripts from accessing the site; in a variation of this second example in which the publisher is an online forum with a limited number of users, the publisher may set the threshold likeness score particularly low at 45% in order maintain a higher level of access to the site for potential new users. Such adjustments are preferably made by the publisher or host website or application through the aforementioned dashboard; the dashboard is preferably accessible through a web browser or mobile application. The publisher, etc., may also user the dashboard to submit an asset, marketing materials, or advertising data, or to generate generic CAPTCHA formats or customize existing CAPTCHA formats. Block S170 may therefore include setting, for the user, a custom range of human likeness scores corresponding to humans based on web traffic history of user, and Block S170 may thus associate the user (e.g., the user's identification data) with a human determination based on the user's human likeness score that falls within the custom range of human likeness scores corresponding to humans. Block S170 may implement similar methods and techniques to set, for the user, a custom range of human likeness scores corresponding to automated software, professional human CAPTCHA solvers, and professional web traffickers based on web traffic history available for the user, and Block S170 may thus associate the user with a determination of automated software, professional human CAPTCHA solver, or professional web trafficker based on the user's human likeness score that falls within the custom range of human likeness scores corresponding thereto. However, the threshold likeness score may be adjusted, modified, or accessed in any other way.

The result of the comparison of the human likeness score to the threshold likeness score is preferably presented to the publisher or host website or application such that the publisher or host may immediately allow or restrict access for the user. In one variation, the server transmits the verification that the user is one of a human, automated script, or human spammer (of Block S170) to the publisher or host. In an alternative variation, the server transmits solely the human likeness score to the publisher or host; in this variation, the recipient of the human likeness score may analyze or otherwise manipulate the score, such as by comparing the human likeness score to a threshold likeness score managed directly by the recipient.

The method S100 may further comprise Block S180, including adding the user solution to a catalog of user preferences. Block S180 is preferably completed for a CAPTCHA that defines a survey, wherein the user solution to the CAPTCHA is indicative of a user preference, and the user preference is preferably only added to the catalog if the human likeness score of the user is above a given value and/or the user is determined to be human. In the example above in which the CAPTCHA requests a user preference for a shade of red of a Chevrolet Camaro, the user solution (that is not the rusty Camaro) may be added to the catalog and the catalog subsequently used by General Motors in the selection of the standard shade of red for a future Chevrolet Camaro line. However, the CAPTCHA that is a survey may be of any other form and test any other user preference.

The catalog of user preferences is preferably provided to the publisher and/or the host website or application, but may be made available to any other relevant third-party entity. In the example above: the server may simply serve to complete Blocks S100 through S160 of the method S100; the host may be a website paid by the publisher to display the CAPTCHA surveys; the publisher may be a marketing agency tasked with assembling survey CAPTCHAs for General Motors; General Motors may be a third party that pays for the results of the survey, wherein General Motors receives the results of the survey through the publisher. However, any parties associated with the method S100 may fulfill any other role and share any other information or survey result with any other party.

In the variation in which the CAPTCHA is a survey, the generic form of the CAPTCHA is preferably generated by the publisher (or a representative thereof). The publisher preferably accesses a dashboard provided by the server and generates the generic survey CAPTCHA therein, such as by providing assets and materials available to the publisher. Alternatively, the server (or a representative thereof) may receive assets from the publisher and generate the generic survey CAPTCHA at the request of the publisher. However, any other entity may generate and/or adjust the survey-type CAPTCHA. Furthermore, an asset provided by the publisher or other entity may simply be incorporated into the CAPTCHA as an advertisement, wherein the advertisement is distinct from any survey aspect of the CAPTCHA. The CAPTCHA selected for the user may be based upon the advertisement depicted therein, wherein the advertisement is tailored to user, such as by noting a cookie of the user, a past website visited by the user, an interest of the user siphoned from a social network or other account, or a demographic of the user; for example, the CAPTCHA of FIG. 3H may be matched to the user of FIG. 1.

The method S100 may further comprise Block S190, including generating the CAPTCHA. The CAPTCHA is preferably generated by the server upon request for a CAPTCHA from the publisher and/or the host of the website or application. However, the publisher or host may also generate the CAPTCHA. The CAPTCHA is preferably selected from a set of available generic CAPTCHA formats, such as those shown in FIGS. 3A-3H. The set of available CAPTCHA formats may be specific to a particular publisher or host, and the selection thereof may be suggested or requested directly by the publisher or host. Once the format of the CAPTCHA is selected, details thereof are preferably subsequently assigned. Specifically, as described above, a characteristic of the object depicted within the graphical interface of the CAPTCHA is preferably pseudorandomly assigned, such as any of an initial location, an initial orientation, an initial speed, and an initial direction of motion to the object. Once the CAPTCHA is selected and/or the relevant details thereof determined, the entirety of the CAPTCHA may be transmitted to the publisher and/or host for subsequent presentation to the user. However, generic CAPTCHA formats may be stored by the publisher and/or host such that only the details of the variables of the CAPTCHA must be transmitted thereto; this may yield the benefit of decreasing the time between when the user attempts to access a site or service and when the CAPTCHA is presented to the user. However, the CAPTCHA and the details thereof may be generated, selected, assigned, and/or transmitted in any other way.

As shown in FIG. 12, one variation of the method includes: receiving a request from a publisher for a human likeness score of a user accessing a webpage through a web browser executing on a computing device; based on the request, collecting identification data of the user; collecting a cursor motion entered by the user into the web browser; extracting a noise component from the cursor motion; identifying a motion geometry in the cursor motion; accessing a noise model defining input noise characteristics of cursor inputs previously entered into graphical user interfaces by known humans; accessing a motion model characterizing cursor motion geometries previously entered into graphical user interfaces by known humans; calculating a human likeness score of the user based on a comparison of the noise component to the noise model and based on a comparison of the motion geometry to the motion model, the human likeness score lying within a continuum of human likeness scores; and associating the identification data of the user with a human determination based on the human likeness score falling within a range of human likeness scores corresponding to humans.

A similar variation of the method includes: receiving a request from a publisher for a human likeness score of users accessing a webpage affiliated with the publisher; in response access of the webpage by a user through a web browser executing on a computing device, collecting a cursor motion entered by the user into the web browser; extracting a noise component from the cursor motion; accessing a noise model defining input noise characteristics of cursor inputs previously entered into graphical user interfaces by known humans; calculating a human likeness score of the user based on a comparison of the noise component to the noise model, the human likeness score lying within a continuum of human likeness scores; and transmitting a human determination of the user to the publisher based on the human likeness score of the user falling within a range of human likeness scores corresponding to humans.

Generally, as described above, the foregoing variations of the method may be executed within a webpage—accessed by a user through a web browser—and outside of a graphical interface defining a traditional CAPTCHA. For example, Blocks of the method may be executed on a remote server in cooperation with a webpage publisher to track interactions (e.g., cursor inputs) entered by a user over a webpage within a web browser and to extrapolate a human likeness score for the user from the interactions, such as exclusive of a user solution to an implicit or explicit CAPTCHA-related prompt or instruction provided through the graphical interface. The method may therefore be executed to distinguish human users and automated users based on user interaction data collected "in the background" as a user browses a webpage (or multiple webpages). However, the human users and automated users can be distinguished in any other suitable manner, based on any other suitable information.

In the foregoing variations, a remote server, an application server, or other computer or computer network may execute the method described above for distinguishing humans users from automated users (i.e., automated software) in response to receiving a request from a web publisher for monitoring the particular user as or once the user has navigated to a particular webpage. The method may therefore selectively apply the foregoing procedure for distinguishing humans users from automated users to a subset of traffickers to a particular webpage or to a particular website. Alternatively, the remote server (or computer or other computer network) may be set to execute the procedure described herein for each user or for each new user who accesses the particular webpage. Therefore, in this variation, once a user navigates to and/or opens a particular webpage, the remote server (or computer or other computer network) may initiate the method by collecting cursor and/or other inputs entered into the his web browser over the particular webpage. For example, the remote server may record a cursor motion entered by the user through the web browser in response to access of the webpage by the computing device through the (user's) web browser. As described above, the method may collect and store (e.g., remotely in a remote database), a cursor path, mouse clicks, keystroke, a gesture, and/or other inputs entered by the user into a computing device while viewing the webpage.

Upon receipt of a request to apply the method to a particular user navigating to a particular webpage or in response to navigation by the particular user to a website contracted for application of the method, the remote server (or other computer or computer network) may implement methods and techniques described above to collect identification information of the user, such as the user's Internet Protocol ("IP") address. The remote server may then apply methods and techniques described above to transform cursor inputs, keystrokes, mouse clicks, and/or other inputs supplied by the user through the web browser into a human likeness score and to then transform the human likeness score into a determination that the user is either a human user or automated software (or a human user paid to navigate through websites).

The remote server may then execute Blocks of the method to store the human likeness score calculated for the user with the user's identification information (e.g., IP address), such as in a remote database with human likeness scores and identification information of all other users monitored according to the method, of all other user with the same or similar human likeness scores, of all other users monitored according to the method within a particular period of time (e.g., three months), of all other users monitoring within a particular land area or region (e.g., the western United States), of all other users monitored on behalf of the publisher of a group of publishers, and/or of all other users trafficking the particular webpage or website, etc. The remote server may also store the human (or automated software) determination calculated for the user—with a user identifier and/or human likeness score—in the database; the remote server may similarly group the user identifier and human likeness score within other users associated with the same human (or automated software) determination. The user identifier can be a user IP address or be any other suitable identifier. The remote server (or other computer or computer network) may thus implement Blocks of the method to build a "white list" of IP addresses (or other identification information) of users who have previously been determined to be human; the remote server may similarly implement Blocks of the method to build a "blacklist" of IP addresses (or other identification information) of users who have previously been determined to be automated software or paid Internet traffickers.

The method can additionally or alternatively include categorizing users within a third party's list of user identifiers based on the generated list, which can function to identify human users within the third party list, remove non-human users from the third party list, or otherwise leverage the information within the third party list. Categorizing users within a third party's list of user identifiers can include matching (e.g., within a margin of error, exactly, etc.), synchronizing, or otherwise identifying unique user identifiers shared between the generated list(s) and the third party user identifier list(s). In one variation, the human likeness score from the generated list can be assigned to the corresponding user identifier within the third party user identifier list. In a second variation, the user identifiers shared between the white list and the third party user identifier list can be positively identified as human users. In a third variation, user identifiers shared between the black list and the third party user identifier list can be positively identified as automated software or Internet traffickers. However, the user identifiers within the third party list can be otherwise categorized.

The third party user identifier list can include a list of email addresses, IP addresses, MAC addresses, or any other suitable type of identifier. The identifiers within the third party list can be the same type as that of the generated list, or be different. In the latter instance, a reference list can be used to translate the identifier within the generated list into the identifier within the third party list. For example, a reference list having emails associated with IP addresses can be used to translate IP addresses (used by the generated list) into email addresses (used by the third party list), such that the human likeness score or other information within the generated list can be assigned based on matching email addresses. However, the users identified within the third party list can be otherwise categorized.

Thus, in the foregoing implementation, when a particular user returns to the same webpage at a later time, the remote server may access the white list, identify the user on the white list based on the user's current IP address that matches an IP address stored in the white list, and pass a human determination (or other confirmation to provide access to the user) back to the publisher substantially immediately (e.g., in real- or near-real time) upon navigation by the user to the webpage (or website) and without necessitating capture and processing of the user's cursor inputs, keystrokes, mouse clicks, etc. to generate a new human likeness score for the user. Similarly, the remote server (or other computer or computer network) may retrieve the user's human likeness score from the database in response to receipt of a request from a second publisher for the human likeness score associated with the Internet Protocol address of the user. The remote server may therefore: collect a first set of interactions entered by the user into a web browser while viewing one webpage or website; generate a human likeness score and/or a human (or automated software) determination from the human likeness score based on the first set of interactions; store the human likeness score and/or the human determination of the user with the user's IP address; and recall the user's human likeness score and/or human determination from the database or other memory when the user visits a second webpage or website, such as in response to a request from a second publisher for a human likeness score and/or a human determination of the user when the user navigates to the second webpage or to the second website affiliated with the second publisher. The remote server may further pass the user's human likeness score and/or human determination with the user's IP address (or other identification information) to the second publisher as described above.

Furthermore, when the user navigates to the same or other webpage at a later time, the remote server (or other computer or computer network) can: record the user's IP address and/or other identification information from the user; collect user cursor motions, keystrokes, mouse clicks, etc. entered by the user over the same or other webpage at the later time; combine these new interaction data with previous interaction data collected from the user and stored with the user's IP address in a remote database; calculate a new human likeness score and/or a new human determination from the combination of new and old user interaction data; and update the human likeness score and/or a new human determination stored within the user's IP address in the database accordingly. Alternatively, the remote server can: execute Blocks of the method as described above to generate a second human likeness score for the user based on new interaction data entered by the user at the second time; aggregate, average, or otherwise combine the new human likeness score of the user with one or more previous human likeness scores of the user; generate a new human determination from the aggregate human likeness score; and update the human likeness score and/or human determination for the user stored within the user's IP address in the database accordingly.

As a person skilled in the art will recognize from the previous detailed description and from the figures and claims, modifications and changes may be made to the preferred embodiments of the invention without departing from the scope of this as invention defined in the following claims.

What is claimed is:

1. A method for distinguishing a human user from automated software, the method comprising:
    receiving a request from a publisher for a human likeness score of a user accessing a web page through a web browser executing on a computing device;
    based on the request, collecting identification data of the user;
    collecting a cursor motion entered by the user into a graphical user interface (GUI) of the web browser;
    extracting a noise component from the cursor motion, the cursor motion comprising a cursor input path viewable within the GUI having visible smooth input portions and visible oscillation input portions or visible deviation input portions defined by a visible cursor within the GUI that moves along the GUI, the noise component being defined by some or all the visible oscillation input portions or the visible deviation input portions of the cursor input path;
    identifying a motion geometry in the cursor motion, the motion geometry defined by one or more visible angles of direction change or one or more visible linearities of portions of the cursor input path viewable within the GUI;
    accessing a noise model defining input noise characteristics of cursor inputs previously entered into graphical user interfaces by known humans different from the user;
    accessing a motion model characterizing cursor motion geometries previously entered into graphical user interfaces by known humans different from the user;
    calculating the human likeness score of the user based on a comparison of the noise component to the noise model and based on a comparison of the motion geometry to the motion model, the human likeness score lying within a continuum of human likeness scores; and
    associating the identification data of the user with a human determination based on the human likeness score falling within a range of human likeness scores corresponding to humans.

2. The method of claim 1, wherein collecting identification data of the user comprises collecting an Internet Protocol address of the computing device; and further comprising, in response to the human likeness score falling within the range of human likeness scores corresponding to humans, storing the Internet Protocol address of the computing device in a database of Internet Protocols addresses of other users associated with human determinations.

3. The method of claim 2, wherein storing the Internet Protocol address of the computing device in the database comprises storing the human likeness score of the user with the Internet Protocol address of the computing device in the database; and further comprising retrieving the human likeness score of the user from the database in response to receipt of a request from a second publisher for the human likeness score associated with the Internet Protocol address of the computing device.

4. The method of claim 1, wherein the cursor motion is a first cursor motion, the web page is a first web page, the noise component is a first noise component, the motion geometry is a first motion geometry, and the human likeness score is a first human likeness score, the method further comprising:
    collecting a second cursor motion entered by the user into the web browser over a second web page distinct from the first web page;
    extracting a second noise component from the second cursor motion;
    identifying a second motion geometry in the second cursor motion;
    calculating a second human likeness score of the user based on a comparison of the second noise component to the noise model and based on a comparison of the second motion geometry to the motion model;
    combining the first human likeness score and the second human likeness score into an aggregate human likeness score; and
    reassessing the human determination based on the aggregate human likeness score.

5. The method of claim 1, wherein collecting the cursor motion comprises recording a set of discrete cursor motions input into the web browser; wherein extracting the noise component from the cursor motion comprises generating a characterization of noise across the set of discrete cursor motions; and wherein calculating the human likeness score of the user comprises calculating the human likeness score of the user based on a comparison of the characterization of the noise across the set of discrete cursor motions to the noise model and based on a comparison of motion geometries for discrete cursor motions, in the set of discrete cursor motions, to the motion model.

6. The method of claim 1, wherein collecting the cursor motion entered by the user into the web browser comprises recording the cursor motion entered by the user through the web browser in response to access of the web page by the computing device through the web browser.

7. The method of claim 1, wherein accessing the noise model comprises accessing the noise model comprising a signal-to-noise ratio pattern of the cursor motion geometries previously entered into graphical user interfaces by known humans.

8. The method of claim 1, wherein the user is a first user, the method further comprising associating identification data of a second user with an automated software determination based on a human likeness score of the second user falling outside the range of human likeness scores corresponding to humans.

9. The method of claim 1, wherein identifying the motion geometry in the cursor motion comprises extracting a speed of a cursor movement within the web browser, a direction of the cursor motion within the web browser, and a change of direction of the cursor motion within the web browser; and wherein calculating the human likeness score of the user comprises calculating the human likeness score of the user based on a degree of similarity of the speed of the cursor movement, the direction of the cursor motion, and the change of direction of the cursor motion to a model human cursor movement, a model human direction of the cursor motion, and a model human cursor direction change, respectively, defined in the motion model.

10. The method of claim 1, further comprising setting a custom range of human likeness scores corresponding to humans for the user based on web traffic history of the user; and wherein associating the identification data of the user with the human determination comprises associating the identification data of the user with the human determination based on the human likeness score falling within the custom range of human likeness scores corresponding to humans.

11. The method of claim 1:
further comprising, in response to receiving the request from the publisher, generating a Completely Automated Public Turing test to tell Computers and Humans Apart (CAPTCHA) comprising a graphical interface and a first object and a second object depicted within the graphical interface;
further comprising assigning a visual characteristic of the first object within the graphical interface to differentiate the CAPTCHA from a previously-generated CAPTCHA, the first object distinct from the second object by the visual characteristic;
further comprising assigning an instruction for solving the CAPTCHA based on the visual characteristic of the first object;
further comprising submitting the CAPTCHA to the publisher for delivery to the user through the web page;
wherein collecting the cursor motion comprises receiving a cursor input provided by the user, through the graphical interface presented through the web page accessed within the web browser, to solve the CAPTCHA;
further comprising determining an accuracy of the cursor input in satisfying the instruction for solving the CAPTCHA;
wherein identifying the motion geometry in the cursor motion comprises extracting an interaction pattern from the cursor motion; and
wherein calculating the human likeness score of the user comprises calculating the human likeness score of the user based on a comparison of the interaction pattern to an interaction pattern model generated from interaction patterns of previous users and based on the accuracy of the cursor input in satisfying the instruction for solving the CAPTCHA.

12. A method for distinguishing a human user from automated software, the method comprising:
receiving a request from a publisher for a human likeness score of users accessing a web page affiliated with the publisher;
in response to accessing of the web page by a user through a web browser executing on a computing device, collecting a cursor motion entered by the user into a graphical user interface (GUI) of the web browser;
extracting a noise component from the cursor motion, the cursor motion comprising a cursor input path viewable within the GUI having visible smooth input portions and visible oscillation input portions or visible deviation input portions defined by a visible cursor within the GUI that moves along the GUI, the noise component being defined by some or all the visible oscillation input portions or the visible deviation input portions of the cursor input path;
identifying a motion geometry in the cursor motion, the motion geometry defined by one or more visible angles of direction change or one or more visible linearities of portions of the cursor input path viewable within the GUI;
accessing a noise model defining input noise characteristics of cursor inputs previously entered into graphical user interfaces by known humans different from the user;
accessing a motion model characterizing cursor motion geometries previously entered into graphical user interfaces by known humans different from the user;
calculating the human likeness score of the user based on a comparison of the noise component to the noise model and based on a comparison of the motion geometry to the motion model, the human likeness score lying within a continuum of human likeness scores; and
transmitting a human determination of the user to the publisher based on the human likeness score of the user falling within a range of human likeness scores corresponding to humans.

13. The method of claim 12, further comprising collecting identification data of the user and storing the identification data of the user and the human determination of the user in a database.

14. The method of claim 13, wherein storing the identification data of the user and the human determination of the user in the database comprises, storing the identification data of the user and the human likeness score of the user in a database of identification information of other users associated with human determinations.

15. The method of claim 13, wherein the cursor motion is a first cursor motion, the web page is a first web page, the noise component is a first noise component, and the human likeness score is a first human likeness score, the method further comprising:
collecting a second cursor motion entered by the user into the web browser over a second web page distinct from the first web page;
extracting a second noise component from the second cursor motion;
calculating a second human likeness score of the user based on a comparison of the second noise component to the noise model;
combining the first human likeness score and the second human likeness score into an aggregate human likeness score;
reassessing the human determination based on the aggregate human likeness score; and
updating the database with the human determination based on the aggregate human likeness score.

16. The method of claim 13, wherein the pubisher is a first publisher, the method further comprising retrieving the human likeness score of the user from the database in response to receipt of a request from a second publisher for the human likeness score of the user.

17. The method of claim 12, wherein extracting the noise component from the cursor motion comprises characterizing a signal-to-noise ratio pattern of the cursor motion; wherein accessing the noise model comprises accessing the noise model comprising a model signal-to-noise ratio pattern based on cursor motions previously entered into graphical user interfaces by known humans; and wherein calculating the human likeness score of the user comprises calculating the human likeness score of the user based on a degree of similarity between the signal-to-noise ratio pattern of the cursor motion and the model signal-to-noise ratio pattern.

18. The method of claim 12, wherein the user is a first user, the method further comprising transmitting an automated software determination to the publisher based on a human likeness score of a second user falling within a range of human likeness scores corresponding to automated software, the range of human likeness scores corresponding to automated software substantially distinct from the range of human likeness scores corresponding to humans.

19. The method of claim 1, wherein the comparison of the noise component to the noise model includes comparing the visible oscillation input portions or the visible deviation input portions of the cursor input path to oscillations or deviations of the noise model, and wherein the comparison of the motion geometry to the motion model includes comparing the one or more visible angles of direction change or the one or more visible linearities of portions of the cursor input path to one or more angles of direction change or one or more linearities of the motion model.

20. The method of claim 12, wherein the comparison of the noise component to the noise model includes comparing the visible oscillation input portions or the visible deviation input portions of the cursor input path to oscillations or deviations of the noise model, and wherein the comparison of the motion geometry to the motion model includes comparing the one or more visible angles of direction change or the one or more visible linearities of portions of the cursor input path to one or more angles of direction change or one or more linearities of the motion model.

\* \* \* \* \*